United States Patent
Kondo

(10) Patent No.: US 9,628,672 B2
(45) Date of Patent: Apr. 18, 2017

(54) CONTENT PROCESSING APPARATUS, CONTENT PROCESSING METHOD, AND STORAGE MEDIUM

(75) Inventor: Tetsujiro Kondo, Tokyo (JP)

(73) Assignee: I-CUBED RESEARCH CENTER INC., Tokyo (JP)

(*) Notice: Subject to any disclaimer, the term of this patent is extended or adjusted under 35 U.S.C. 154(b) by 0 days.

(21) Appl. No.: 14/237,726

(22) PCT Filed: Aug. 1, 2012

(86) PCT No.: PCT/JP2012/069542
§ 371 (c)(1),
(2), (4) Date: Feb. 7, 2014

(87) PCT Pub. No.: WO2013/021880
PCT Pub. Date: Feb. 14, 2013

(65) Prior Publication Data
US 2014/0176799 A1 Jun. 26, 2014

(30) Foreign Application Priority Data

Aug. 8, 2011 (JP) ................................. 2011-172947

(51) Int. Cl.
*G06K 9/00* (2006.01)
*H04N 5/14* (2006.01)
(Continued)

(52) U.S. Cl.
CPC ............. *H04N 5/14* (2013.01); *G06T 7/0002* (2013.01); *H04N 17/004* (2013.01); *G06T 2207/10016* (2013.01); *G06T 2207/30168* (2013.01)

(58) Field of Classification Search
CPC ...... H04N 17/004; H04N 5/14; G06T 7/0002; G06T 2207/30168
See application file for complete search history.

(56) References Cited

U.S. PATENT DOCUMENTS 6,400,841 B1* 6/2002 Khoury ................. G06T 7/0004
  345/419
6,597,815 B1* 7/2003 Satoh ..................... G06T 9/005
  382/250

(Continued)

FOREIGN PATENT DOCUMENTS

CN  1359235 A  7/2002
JP  5-176179 A  7/1993
(Continued)

OTHER PUBLICATIONS

Machine translated English version of Japanese Patent Application No. 2008-287329, published on Nov. 27, 2008 (Original Japanese version also included to provide mathematical formulas and Figures).*

(Continued)

*Primary Examiner* — Li Liu
(74) *Attorney, Agent, or Firm* — Troutman Sanders LLP

(57) ABSTRACT

A content processing apparatus includes a processing information storage unit that stores processing information which is information on processing to be performed on a content, a content accepting unit that accepts an input content, a processing unit that executes, on the input content, processing indicated by the processing information, and obtains an output content, a qualitative information acquiring unit that acquires at least one type of qualitative information from among output qualitative information, which is qualitative information on the output content, and input qualitative information, which is qualitative information on the input content, and an output unit that outputs the qualitative information acquired by the qualitative information acquiring unit.

15 Claims, 34 Drawing Sheets

(51) Int. Cl.
   *H04N 17/00*    (2006.01)
   *G06T 7/00*    (2017.01)

(56) References Cited

U.S. PATENT DOCUMENTS

| | | | |
|---|---|---|---|
| 6,775,408 | B1 | 8/2004 | Masaki |
| 7,565,691 | B2 | 7/2009 | Kitani |
| 7,627,696 | B2 | 12/2009 | Suematsu et al. |
| 7,646,415 | B2 | 1/2010 | Sugimoto |
| 2004/0168073 | A1 | 8/2004 | Bourne et al. |
| 2004/0227069 | A1* | 11/2004 | Sendai et al. ............ 250/252.1 |
| 2007/0047808 | A1 | 3/2007 | Choe et al. |
| 2007/0269126 | A1* | 11/2007 | Choe et al. ................. 382/254 |
| 2008/0018920 | A1 | 1/2008 | Kawamoto et al. |
| 2008/0025400 | A1 | 1/2008 | Sugimoto et al. |
| 2009/0208140 | A1* | 8/2009 | Jayant ................. G06T 7/0004 382/309 |
| 2010/0329526 | A1 | 12/2010 | Pfister et al. |
| 2011/0157409 | A1* | 6/2011 | Adachi ..................... 348/222.1 |

FOREIGN PATENT DOCUMENTS

| | | |
|---|---|---|
| JP | 2825482 B2 | 11/1998 |
| JP | 3072306 B2 | 7/2000 |
| JP | 2002-92129 A | 3/2002 |
| JP | 2008-28550 A | 2/2008 |
| JP | 2008-35357 A | 2/2008 |
| JP | 2008-287329 A | 11/2008 |
| JP | 2009027432 A | 2/2009 |
| TW | I313847 B | 9/2009 |
| TW | I314275 B | 9/2009 |
| TW | I329867 B | 9/2010 |
| TW | I333363 B | 11/2010 |

OTHER PUBLICATIONS

International Search Report, dated Sep. 4, 2012, which issued during the prosecution of International Patent Application No. PCT/JP2012/069542, which corresponds to the present application.
European Search Report having a mail date of Mar. 26, 2015, issued in corresponding European Patent Application No. 12822917.6.
Chinese Office Action issued in corresponding Chinese Patent Application No. 201280038681.X.
Japanese Office Action mailed Jul. 28, 2015 issued in corresponding Japanese Patent Application No. 2011-172947.
First Office Action dated Nov. 12, 2015 issued in corresponding Taiwanese Patent Application No. TW101128177.
The Second Office Action dated Feb. 25, 2016 issued in corresponding Chinese Application No. CN201280038681.X.
The Third Chinese Office Action mailed on Aug. 4, 2016 issued in corresponding Chinese Patent Application No. CN201280038681.X.
Decision of Rejection datwed Dec. 5, 2016 issued in corresponding Chinese Patent Application No. 201280038681X.

* cited by examiner

Information on difference between regions

Divide screen into 4 x 4 in rows and columns, and obtain sixteen subscree

CONTENT PROCESSING APPARATUS, CONTENT PROCESSING METHOD, AND STORAGE MEDIUM

CROSS-REFERENCE TO RELATED APPLICATIONS

This is a U.S. national phase application under 35 U.S.C. §371 of International Patent Application No. PCT/JP2012/069542, filed on Aug. 1, 2012, and claims benefit of priority to Japanese Patent Application No. JP 2011-172947, filed on Aug. 8, 2011. The International Application was published on Feb. 14, 2013, as International Publication No. WO 2013/021880 under PCT Article 21(2). The entire contents of these applications are hereby incorporated by reference.

TECHNICAL FIELD

The present invention relates to a content processing apparatus and the like for processing contents, and to manual or automatic updating of a method for processing contents. The present invention also relates to information presentation that enables this updating of the processing method to be performed efficiently.

BACKGROUND ART

Conventionally, in the field of development of a signal processing method applied to an image, which is an example of a content, a developer has invented a new signal processing method based on evaluation results obtained by viewing input/output images and evaluation results obtained by using an objective image quality evaluation scale.

Examples of the above-described image quality evaluation scale include image quality evaluation using an objective evaluation apparatus that automatically estimates the subjective quality of a video for a multimedia application without involving judgments based on subjective view of a human. Such an objective evaluation apparatus is a video quality objective evaluation apparatus that estimates the subjective quality of a video by analyzing video signals of two systems, that is, video signals of an original image and an evaluation target image, the apparatus including: a feature amount extraction unit that extracts, as feature amounts, the block skewness of the evaluation target image with respect to the original image, PSNR global time variability with respect to frames in a sequence, and PSNR local time variability for each frame; an objective image quality index calculation unit that calculates an objective image quality index by obtaining a weighted sum of the block skewness, the PSNR global time variability, and the PSNR local time variability; a frame rate detection unit that detects a frame rate of the evaluation target image; a correction unit that corrects the objective image quality index calculated by the objective image quality index calculation unit on the basis of the frame rate detected by the frame rate detection unit; and a subjective image quality estimation value derivation unit that derives a subjective image quality estimation value by applying the corrected objective image quality index to a correlation between a predetermined objective image quality index and a subjective image quality (see Patent Document 1).

CITATION LIST

Patent Document

[Patent Document 1] JP 2008-35357A (Page 1, FIG. 1, etc.)

SUMMARY OF INVENTION

Technical Problem

In the conventional technique, however, it is difficult for a developer to understand in which point in signal processing improvement should be made even by, for example, viewing an image and utilizing an objective image quality evaluation scale, and thus development of a signal processing method depends significantly on experiences, inspirations, and trial and error of the developer.

Solution to Problem

A first aspect of the present invention is directed to a content processing apparatus including: a processing information storage unit in which processing information, which is information on processing to be performed on a content, can be stored; a content accepting unit that accepts an input content; a processing unit that executes, on the input content, processing indicated by the processing information, and obtains an output content; a qualitative information acquiring unit that acquires at least one type of qualitative information from among output qualitative information, which is qualitative information on the output content, and input qualitative information, which is qualitative information on the input content; and an output unit that outputs the qualitative information acquired by the qualitative information acquiring unit.

With this configuration, it is possible to intuitively evaluate characteristics of the input content or the output content, and to improve a signal processing method more efficiently.

Furthermore, a second aspect of the present invention is directed to the content processing apparatus according to the first aspect, wherein the output unit also outputs at least one of the output content and the input content.

With this configuration, it is possible to improve a signal processing method more efficiently by intuitively evaluating characteristics of the input content or the output content, and viewing, at the same time, what content is actually input/output.

Furthermore, a third aspect of the present invention is directed to the content processing apparatus according to the first or second aspect, further including: a processing information accepting unit that accepts new processing information after the output unit has output at least the output qualitative information; and a processing information updating unit that writes the processing information accepted by the processing information accepting unit over the processing information in the processing information storage unit.

With this configuration, a developer who has intuitively evaluated characteristics of the input content or the output content can update processing for generating the output content based on the input content with reference to the evaluation.

Furthermore, a fourth aspect of the present invention is directed to the content processing apparatus according to the first or second aspect, further including: an evaluation accepting unit that accepts an evaluation of information including the output qualitative information output by the output unit; a processing information constructing unit that constructs new processing information based on the evaluation; and a processing information updating unit that writes the processing information constructed by the processing information constructing unit over the processing information in the processing information storage unit.

With this configuration, it is possible to automatically update the processing for generating the output content based on the input content with the use of the intuitive evaluation result of the characteristics of the input content or the output content.

Furthermore, a fifth aspect of the present invention is directed to the content processing apparatus according to any one of the first to fourth aspects, wherein the output qualitative information is an output content characteristic diagram graphically illustrating two or more feature amounts of the output content.

With this configuration, it is possible to intuitively evaluate characteristics of the input content or the output content, and to improve a signal processing method more efficiently.

Furthermore, a sixth aspect of the present invention is directed to the content processing apparatus according to the fifth aspect, wherein the output content characteristic diagram is a diagram illustrating two or more output spatiotemporal activities that are temporal and spatial activities of the output content.

With this configuration, it is possible to intuitively evaluate characteristics of the input content or the output content, and to improve a signal processing method more efficiently.

Furthermore, a seventh aspect of the present invention is directed to the content processing apparatus according to any one of the first to fourth aspects, wherein the input qualitative information is an input content characteristic diagram graphically illustrating two or more feature amounts of the input content.

With this configuration, it is possible to intuitively evaluate characteristics of the input content or the output content, and to improve a signal processing method more efficiently.

Furthermore, an eighth aspect of the present invention is directed to the content processing apparatus according to the seventh aspect, wherein the input content characteristic diagram is a diagram illustrating two or more input spatiotemporal activities that are spatial and temporal activities of the input content.

With this configuration, it is possible to intuitively evaluate characteristics of the input content or the output content, and to improve a signal processing method more efficiently.

Furthermore, a ninth aspect of the present invention is directed to the content processing apparatus according to any one of the first to eighth aspects, wherein the processing information at least includes: first processing information for performing first processing, and second processing information for performing second processing, the processing unit includes: a first processing part that executes, on the input content, the processing indicated by the first processing information, and obtains an intermediate content; and a second processing part that executes, on the intermediate content or a content obtained from the intermediate content, the processing indicated by the second processing information, and obtains an output content, and the output unit also outputs the intermediate content.

With this configuration, it is also possible to intuitively evaluate characteristics of the intermediate content as well, and to improve a signal processing method more efficiently.

Furthermore, a tenth aspect of the present invention is directed to the content processing apparatus according to any one of the first to eighth aspects, wherein the processing information at least includes: first processing information for performing first processing; and second processing information for performing second processing, the processing unit includes: a first processing part that executes, on the input content, the processing indicated by the first processing information, and obtains an intermediate content; and a second processing part that executes, on the intermediate content or a content obtained from the intermediate content, the processing indicated by the second processing information, and obtains an output content, the qualitative information acquiring unit also acquires intermediate qualitative information, which is qualitative information on the intermediate content, and the output unit also outputs the intermediate qualitative information.

With this configuration, it is also possible to intuitively evaluate the intermediate qualitative information as well, and to improve a signal processing method more efficiently.

Furthermore, an eleventh aspect of the present invention is directed to the content processing apparatus according to any one of the first to tenth aspects, wherein the input content and the output content are images.

With this configuration, it is possible to intuitively evaluate characteristics of the input image or the output image, and to improve an image processing method more efficiently.

Furthermore, a twelfth aspect of the present invention is directed to the content processing apparatus according to any one of the first to tenth aspects, wherein the input content and the output content are sound information.

With this configuration, it is possible to intuitively evaluate characteristics of the input sound or the output sound, and to improve a voice processing method more efficiently.

Advantageous Effects of Invention

According to the content processing apparatus of the present invention, it is possible to intuitively evaluate characteristics of an input content or an output content, and to improve a signal processing method more efficiently.

DESCRIPTION OF EMBODIMENT

Figure 1:
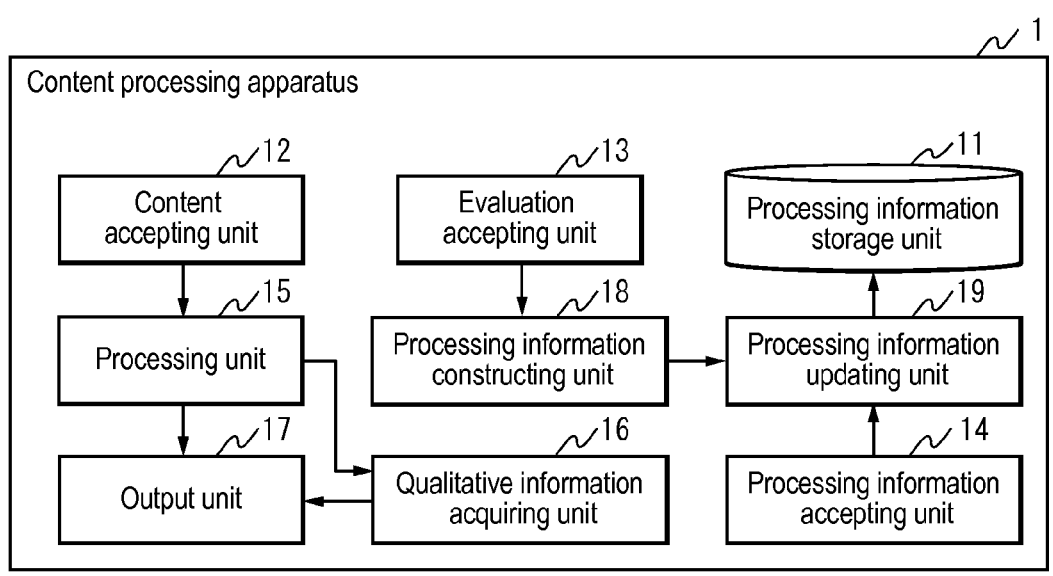
FIG. 1 is a block diagram illustrating a content processing apparatus according to Embodiment 1.

Hereinafter, embodiments of a content processing apparatus and the like will be described with reference to the drawings. It should be noted that, in the embodiments, constituent elements denoted by the same reference numerals perform similar operations, and thus descriptions thereof may not be repeated.

Embodiment 1

In this embodiment, a content processing apparatus will be described that performs processing on an input content, obtains an output content, acquires at least one type of qualitative information from among output qualitative information, which is qualitative information on the output content, and input qualitative information, which is qualitative information on the input content, and outputs the acquired output qualitative information or input qualitative information.

Furthermore, this embodiment will describe the content processing apparatus that also outputs the input content or the output content.

Furthermore, this embodiment will describe the content processing apparatus that accepts information for replacing the processing by different processing.

Furthermore, this embodiment will describe the content processing apparatus that accepts a user evaluation, and automatically replaces the processing by different processing based on the output qualitative information, or both the output qualitative information and the input qualitative information, according to the evaluation.

FIG. 1 is a block diagram illustrating a content processing apparatus 1 according to the present embodiment. The content processing apparatus 1 includes a processing information storage unit 11, a content accepting unit 12, an evaluation accepting unit 13, a processing information accepting unit 14, a processing unit 15, a qualitative information acquiring unit 16, an output unit 17, a processing information constructing unit 18, and a processing information updating unit 19.

In the processing information storage unit 11, processing information, which is information on processing that is to be performed on a content, can be stored. The processing information may be a program, data, or the like, and, for example, a look-up table, a noise removal program, a program for performing resolution creation (program relating to a technology disclosed in Japanese Patent Nos. 2825482 and 3072306, for example), a program for performing frame rate conversion, a program for improving gradation, and the like. Note that the look-up table contains one or at least two pieces of association information. The association information refers to information that associates the whole or part of one or more piece of first information with the whole or part of one or more piece of second information (such as an image to be output or sound information to be output). The first information is, for example, an input image, input sound information, or the like. The second information is, for example, an image to be output, sound information to be output, or the like. If the number of pieces of association information contained in the look-up table is one, the association information is, for example, an arithmetic expression for converting information such as an image or sound information, and one or more parameter groups that are to be given to the arithmetic expression for converting information. The association information may be, for example, an arithmetic expression for calculating a median of pixel values of spatiotemporal blocks, or the like. Also, the processing information may be information indicating a tap selection method for performing resolution creation, information indicating a class selection method, mapping coefficients, or the like. The processing information may also be time interpolation filter coefficients used in frame rate conversion, motion detection parameters, or the like. The processing information may also be noise detection parameters for removing noise, filter coefficients, or the like. The processing information may also be gradation detection parameters used for improvement in gradation, gradation creation filter coefficients, or the like.

Furthermore, the processing information may be a program and various types of coefficients for removing noise from a voice, or the like. The processing information may also be a program and various types of coefficients for creating high-frequency range of a voice, a program and various types of coefficients for changing a reproduction speed (fast-forwarding), a program and various types of coefficients for performing sound field reproduction, or the like.

Furthermore, the processing information may include first processing information for performing first processing, and second processing information for performing second processing. The processing information may also include three or more pieces of information for performing processing.

If the look-up table contains two or more pieces of association information, it is preferable that the association information be associated with a feature amount vector, which is an aggregation of feature amounts of the information.

It is also preferable that the association information be information for associating the whole or part of one or more pieces of received first information with the whole or part of the second information, which is information whose load on the brain has been adjusted more appropriately than that of the first information and relates to the same object as that of the first information.

The information whose load on the brain has been adjusted refers to, for example, an image that can reduce more significantly the load on the brain at the time of viewing the image. The image that can reduce the load on the brain more significantly refers to an image that allows the brain to more easily feel one or more attributes such as an appearance, a sense of distance, presence, realistic sensation, weightiness, warmth, coolness, speediness, dynamism, smooth motion, freshness, and an expensive appearance. Note that the attributes varies from image to image. Here, the appearance refers to the appearance of an object contained in an image, such as a texture appearance, gloss, transparency, fluffiness, and a moist appearance. Furthermore, the sense of distance may refer to resolution, a sense of three dimensions, a sense of depth, a sense of air, or the like. Note that an image that can reduce the load on the brain may be restated as an image that is pleasant to the brain.

Furthermore, the information whose load on the brain has been adjusted refers to, for example, one or more piece of information that can be acquired in an environment different from that in which the one or more piece of first information can be acquired. That is, in such a case, for example, the one or more piece of first information and the one or more piece of second information are acquired in different environments. The different environments are, for example, the city and the suburb (that may also be called as the "country"). In this case, the first information is a piece of music played on a street in the noisy city, and the second information is the piece of music played in an environment with almost no noise, for example, in an environment in which, for example, chirping of a bird can be heard, or a wind of 1/f fluctuation blows.

Furthermore, the information whose load on the brain has been adjusted refers to, for example, one or more images that can be captured in another environment different from the environment in which the one or more first images are captured. Note that the other environment refers to an environment different from one environment, and refers to an environment in which an image that provides a better match with the purpose than in the one environment can be captured. The other environment refers to, for example, an environment such as (1) to (9) below: (1) an environment in which the light intensity of illumination (light source) is larger than that in the one environment; (2) an environment in which a light source is positioned such that the shadow of an object in the image is expressed more clearly than in the one environment; (3) an environment in which a light source is positioned such that the sense of three dimensions of an object in the image is expressed more clearly than in the one environment; (4) an environment in which a camera is positioned such that the sense of three dimensions of an object in the image is expressed more clearly than in the one environment; (5) an environment in which the color of illumination is different from that in the one environment; (6) an environment in which the weather is different from that in the one environment; (7) an environment in which the temperature or the humidity is different from that in the one environment; (8) an environment in which the depth of field is different from that in the one environment; and (9) an environment in which the shutter speed is different from that in the one environment. That is to say, in this case, the one environment and the other environment are different from each other in the image capturing environment, such as the amount of light, the position of the light source, the color of the light source, the position of the camera, or the settings of the camera. Furthermore, the environment typically refers to an image capturing environment, but there is no limitation to this as long as it is an environment relating to acquisition of an image.

The processing information storage unit 11 is preferably a nonvolatile storage medium, but may be realized by a volatile storage medium. There is no limitation on the procedure in which processing information is stored in the processing information storage unit 11. For example, the processing information may be stored in the processing information storage unit 11 via a storage medium, the processing information transmitted via a communication line or the like may be stored in the processing information storage unit 11, or the processing information input via an input device may be stored in the processing information storage unit 11.

The content accepting unit 12 receives an input content. The input content is a content that is input. There is no limitation on the type, and the input content may be an image or sound information. The content may also be a combination of two or more types of contents, such as a combination of an image and sound information. In this context, "accepting" typically refers to accepting information transmitted via wired or wireless communication line, or reception from a broadcasting part, and refers to an idea encompassing input via an input device, read-out from a storage medium such as an optical disk, a magnetic disk, or a semiconductor memory, and the like. The input part may be realized by a communication part or a broadcast receiving part.

The evaluation accepting unit 13 accepts an evaluation of information including output qualitative information output by the output unit 17, which will be described later. The information including output qualitative information typically includes an input content and an output content. Furthermore, the information including output qualitative information may also include input qualitative information. Here, the output qualitative information is, for example, an output content characteristic diagram graphically illustrating two or more feature amounts of the output content. The output content characteristic diagram may be referred to as an "output characteristic image" since it is an image illustrating characteristics of the output content. Furthermore, the output qualitative information is, for example, an aggregation of two or more spatiotemporal activities. The spatiotemporal activity typically refers to information relating to a change (difference) between spatially-different regions of two or more images (frames) or two or more voice frames that are temporally-different from each other. Note that the spatially-different regions may overlap each other.

If original information of the spatiotemporal activity is an image, the spatiotemporal activity may refer to an amount indicating a change between two or more spatiotemporally distributed regions (each may include one pixel, or two or more pixels, in the case of an image). Furthermore, the spatiotemporal activity may refer to an amount indicating the result of comparison between two or more regions (each may include one pixel, or two or more pixels).

Note that image data may include multidimensional information in which pieces of information (luminance, color, or the like) on pixels are distributed in temporal and spatial space. If original information of the spatiotemporal activity is an image, the spatiotemporal activity refers to a feature indicating a degree of a change in pixel information between two or more regions of this image that are present in a spatiotemporal region. The spatiotemporal activity itself is also multidimensional information that extends spatiotemporally.

Here, in the spatiotemporal activity, there is no limitation on the positional relationship of two or more regions for which a change is calculated within the spatiotemporal region. Also, the spatiotemporal activity may also include an amount indicating a change between regions that are spatially-identical but temporally-different. Note that the amount indicating a change between regions that are spatially-identical but temporally-different refers to a time activity, to be exact. Also, the spatiotemporal activity may also include an amount indicating a change between regions that are temporally-identical (the same frame) but spatially-different. Note that the amount indicating a change between regions that are temporally-identical but spatially-different refers to a space activity, to be exact. Also, two or more regions for which a change is calculated may have different shapes. For example, if one of the two or more regions for which a change is calculated has a single pixel, and the other has multiple pixels, one of the two regions for which a change is calculated may be a point, and the other may be all spatial-temporal pixels. Furthermore, regions A and B that are two regions for which a change is calculated may be regions having similar shapes and different sizes. Furthermore, the number of regions for which an activity is calculated may be three or more. Furthermore, with respect to multiple region sets in the same image, the spatiotemporal activities may be calculated at the same time. An aggregation of such spatiotemporal activities may be the spatiotemporal activity. Furthermore, by adding up the calculated spatiotemporal activities of different regions, it is possible to obtain a spatiotemporal activity between more wide regions. In such a case, it is possible to use, at the same time, an aggregation of the spatiotemporal activities before adding up and the spatiotemporal activities after adding up. Such use of the aggregation of the spatiotemporal activities refers to use of hierarchical spatiotemporal activities. That is to say, if a spatiotemporal activity is calculated between three regions for example, a difference between (a difference between the region A and the region B) and (a difference between the region B and the region C) may be used as the amount indicating a change in the degree of the change. Also, when comparing between regions, the original information (e.g., pixel information) for which the spatiotemporal activity is obtained may or may not necessarily be processed. For example, the spatiotemporal activity may be a value of the result of comparison between all pixels of the region A and all pixels of the region B, or comparison between a representative pixel of the region A and all pixels of the region B, or comparison between an average pixel value of the region A and all pixels of the region B. Also, the spatiotemporal activity may be reliable information that covers a broader range and is obtained by adding up intermediately obtained activities. The above-described change may be any information as long as it relates to the difference between regions, such as, for example, a simple pixel difference, a pixel difference absolute value, or a pixel difference square. It is also possible to calculate, at the same time, differences between multiple region sets (pairs of two regions, sets of three or more regions) and to add up the differences to an aggregation, which may be used as a spatiotemporal activity. In this case, the regions may overlap each other.

Note that if the spatiotemporal activity is used as qualitative characteristics of information such as an image, it is preferable that the spatiotemporal activity have an amount of information sufficient for graphical display. For this purpose, for example, it is preferable to use, when calculating an individual spatiotemporal activity between regions, a method in which information on distribution of differences between a pixel and a pixel group is held, a method in which spatiotemporal activities of multiple region sets are simultaneously calculated and an aggregation of these pieces of information is used, or other method. The qualitative characteristics (spatiotemporal activities) obtained by these methods can be shown in a diagram in which three-dimensional line graphs are aggregated, a diagram in which differences are indicated in variable gradation, or the like, which will be described later. A user can then evaluate a signal processing method by viewing the graphical display.

Figure 2:
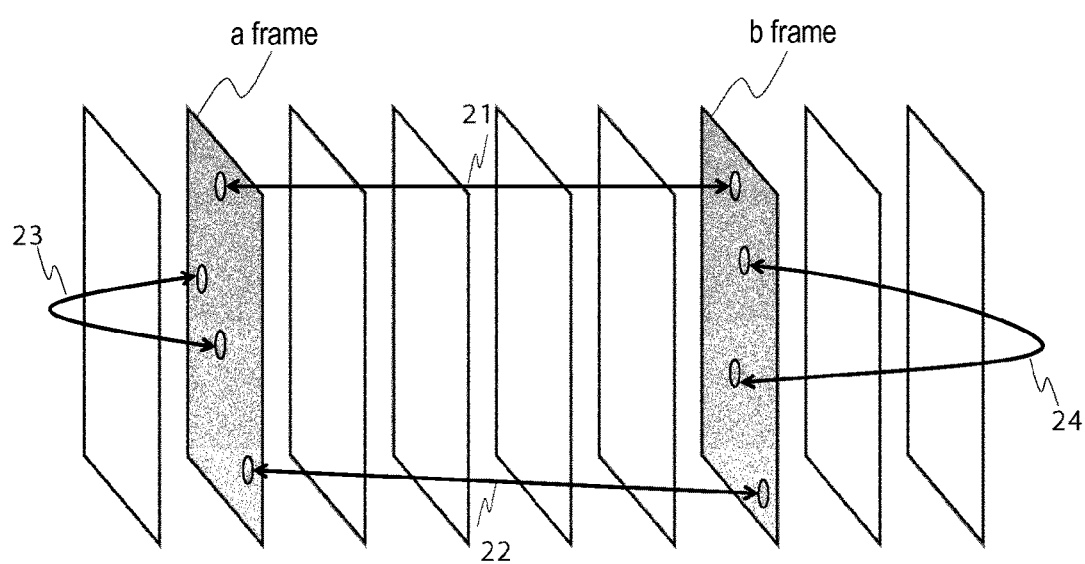
FIG. 2 is a diagram illustrating a first example of a spatiotemporal activity of Embodiment 1.

A first example of the spatiotemporal activity is shown in FIG. 2. In FIG. 2, "a frame" and "b frame" are temporally-different frames. Furthermore, in FIG. 2, differences, denoted by 21 and 22, in feature amounts between two pixels are shown as examples of the spatiotemporal activity. Note that the positions of the corresponding pixels in two frames may be predetermined, or may be set appropriately by, for example, an evaluator (user). Also, as described above, the spatiotemporal activity may include spatial activities and temporal activities. In FIG. 2, examples of the spatial activities are denoted by 23 and 24. Also, the feature amount of a pixel is, for example, a pixel value, a luminance, or the like. Furthermore, the difference may be information relating to a difference, such as a simple difference, a difference absolute value, or a difference square. Information on a difference between two such pixels that is obtained by calculating differences between two or more pixel pairs may also be referred to as the spatiotemporal activity. Evaluation of relationships between many pixels at the same time is appropriate as a qualitative evaluation method.

Figure 3:
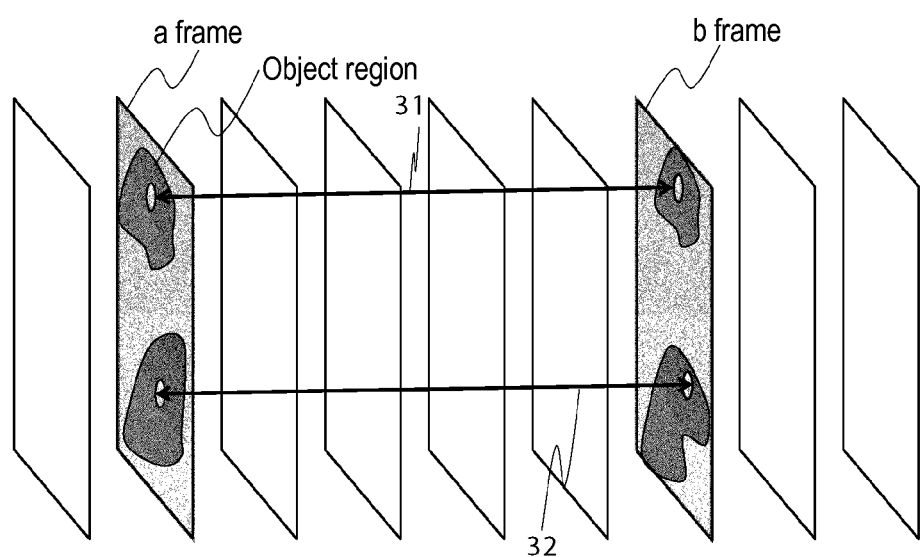
FIG. 3 is a diagram illustrating a second example of the spatiotemporal activity of the embodiment.

A second example of the spatiotemporal activity is shown in FIG. 3. In FIG. 3, "a frame" and "b frame" are temporally-different frames. Furthermore, in FIG. 3, differences, denoted by 31 and 32, in representative pixel value of multiple pixels between two regions are shown as example of the spatiotemporal activity. The representative pixel value refers to a value that represents pixel values of multiple pixels, and is, for example, an average, a median, or the like of pixel values of multiple pixels. The types of the representative pixel value used in the regions may be different from each other. Note that the associated two regions may be different regions in a frame, or regions located at the same position in a frame. Also, the associated two regions may be predetermined or may be set appropriately by, for example, an evaluator. Also, two or more regions in one frame may overlap each other. The region may have any shape. The associated two regions may not necessarily have the same shape. Information on a difference in representative pixel value between two such regions that is obtained by calculating differences between two or more region pairs may also be referred to as the spatiotemporal activity. Evaluation of relationships between many regions at the same time is appropriate as a qualitative evaluation method.

Figure 4:
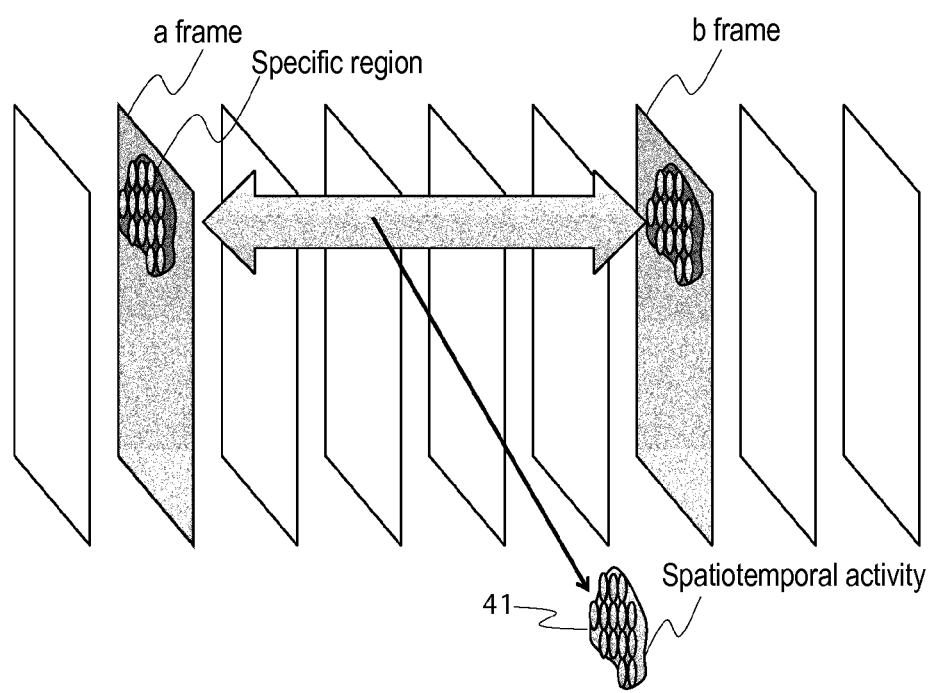
FIG. 4 is a diagram illustrating a third example of the spatiotemporal activity of the embodiment.

A third example of the spatiotemporal activity is shown in FIG. 4. In FIG. 4, "a frame" and "b frame" are temporally-different frames. Furthermore, in FIG. 4, a difference, as denoted by 41, between multiple pixel groups in a specific region in each frame may be the spatiotemporal activity. The difference between pixel groups refers to, for example, a difference in a vector obtained by arranging feature amounts of pixels in order for each region. The feature amount of a pixel refers to a pixel value, a luminance, color information, or the like. The difference in a vector refers to, for example, a simple difference, a difference square, or the like between the vector components. The difference between pixel groups obtained in such a manner is also vector information, and is suitable for use in qualitative evaluation. Note that the associated two regions may be predetermined, or may be set appropriately by, for example, an evaluator.

Figure 5:
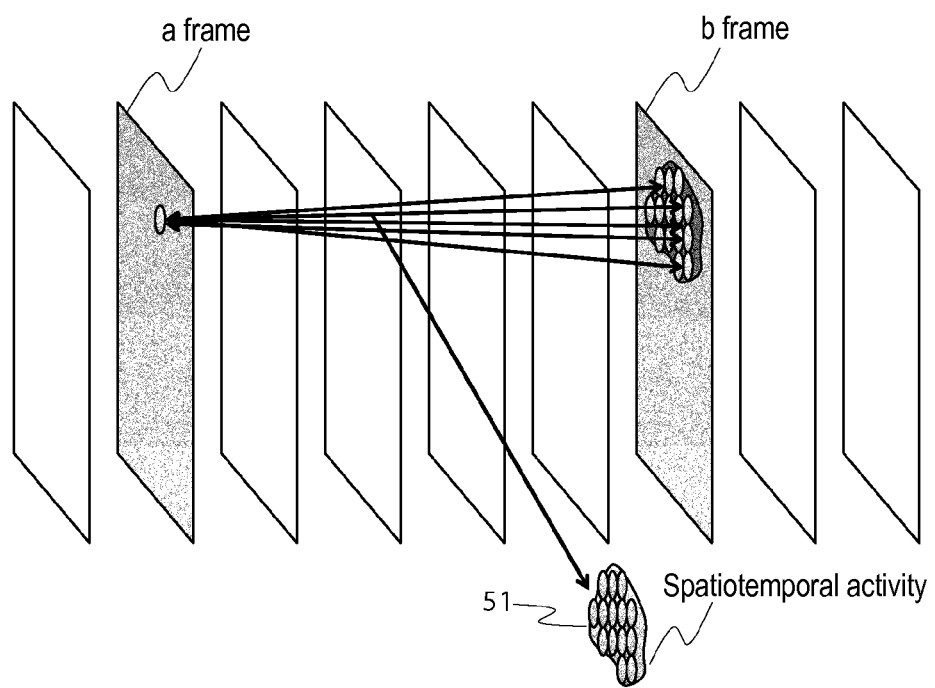
FIG. 5 is a diagram illustrating a fourth example of the spatiotemporal activity of the embodiment.

A fourth example of the spatiotemporal activity is shown in FIG. 5. In FIG. 5, "a frame" and "b frame" are temporally-different frames. Furthermore, in FIG. 5, distribution, as denoted by 51, of differences between a pixel in the "a frame", and pixels constituting a specific region in the "b frame" is the spatiotemporal activity. The spatiotemporal activity obtained in such a manner is multidimensional information that has a spatial extent, and is suitable for use in qualitative evaluation. Note that the pixel in the "a frame" and the pixel group in the "b frame" that are associated with each other may be predetermined, or may be set appropriately by, for example, an evaluator (user).

Figure 6:
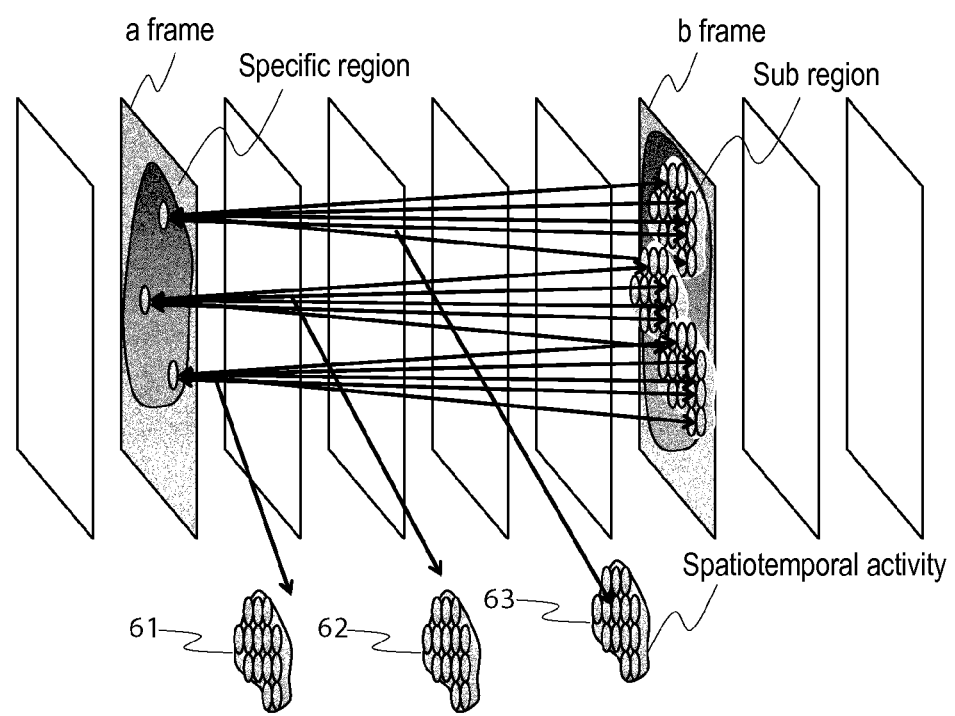
FIG. 6 is a diagram illustrating a fifth example of the spatiotemporal activity of the embodiment.

A fifth example of the spatiotemporal activity is shown in FIG. 6. In FIG. 6, "a frame" and "b frame" are temporally-different frames. Furthermore, in FIG. 6, distributions, as denoted by 61, 62, and 63, of differences between multiple pixels included in a specific region in the "a frame" and pixels constituting multiple sub regions included in a specific region in the "b frame" are the spatiotemporal activities. That is, the fifth example of the spatiotemporal activity is the result obtained by applying the difference calculation of the fourth example to the multiple pixels included in a specific region in the "a frame". It is possible to regard this example as an example of the spatiotemporal activity between a specific region in the "a frame" and a specific region in the "b frame". Note that the pixels in the "a frame" and the pixel groups in the "b frame" that are respectively associated with each other may be predetermined, or may be set appropriately by, for example, an evaluator.

Figure 7:
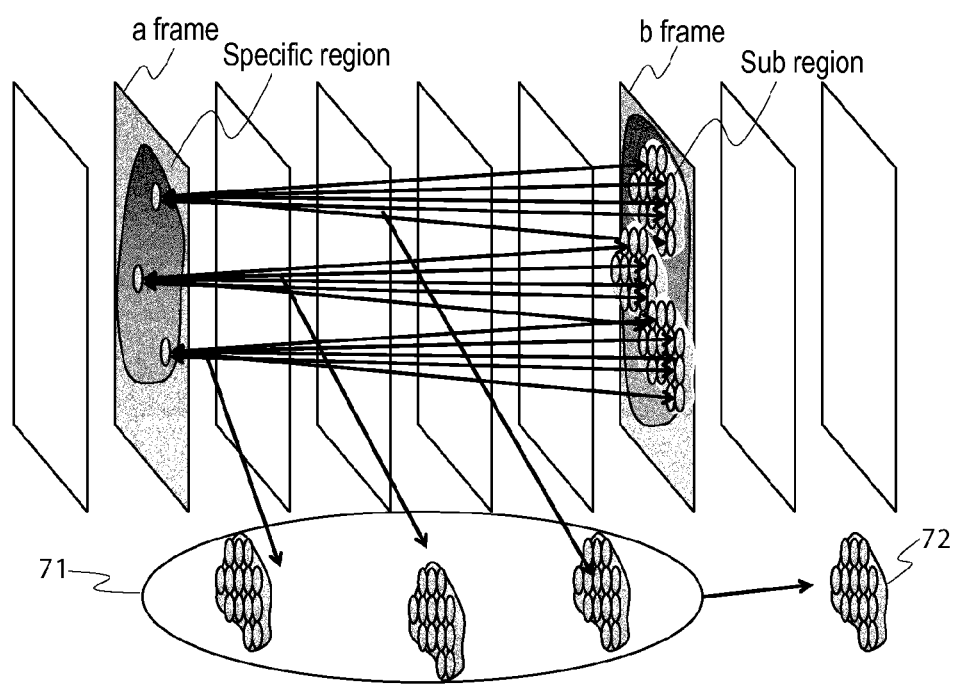
FIG. 7 is a diagram illustrating a sixth example of the spatiotemporal activity of the embodiment.

A sixth example of the spatiotemporal activity is shown in FIG. 7. In FIG. 7, "a frame" and "b frame" are temporally-different frames. Furthermore, in FIG. 7, the spatiotemporal activity is a result 72 obtained by adding up distributions of differences (e.g., three difference distributions in this example) between multiple pixels included in a specific region in the "a frame" and pixels constituting multiple sub regions included in a specific region in the "b frame". Note that the pixels in the "a frame" and the pixel groups in the "b frame" that are respectively associated with each other may be predetermined, or may be set appropriately by, for example, an evaluator.

Note that although the "a frame" and the "b frame" in FIGS. 2 to 7 are preferably different frames that are temporally consecutive, it is sufficient that they are just different frames and not necessarily temporally consecutive.

Hereinafter, a further description on the spatiotemporal activity will be given with reference to FIGS. 8 to 13. Note that in FIGS. 8 to 13, information for which a spatiotemporal activity is obtained includes two or more frames and two types of axes, that is, spatial axes in horizontal/vertical directions, and a temporal axis in the frame direction.

Figure 8:
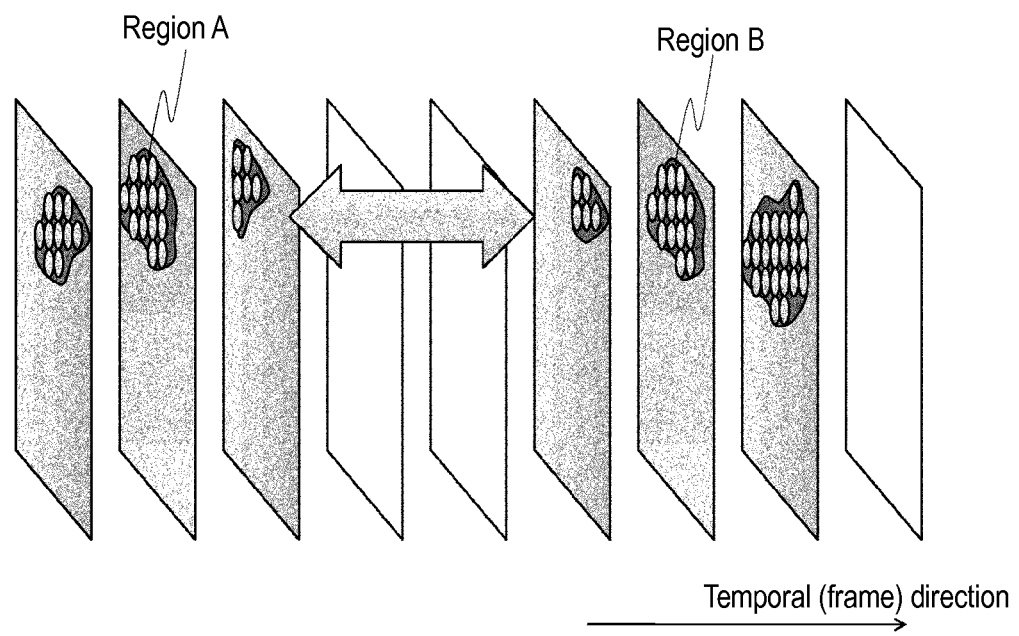
FIG. 8 is a diagram illustrating a seventh example of the spatiotemporal activity of the embodiment.

FIG. 8 illustrates a seventh example of the spatiotemporal activity. In FIG. 8, the spatiotemporal activity is an amount that indicates a change in feature amount between two or more regions (for example, the region A and the region B) that are spatiotemporally distributed.

Figure 9:
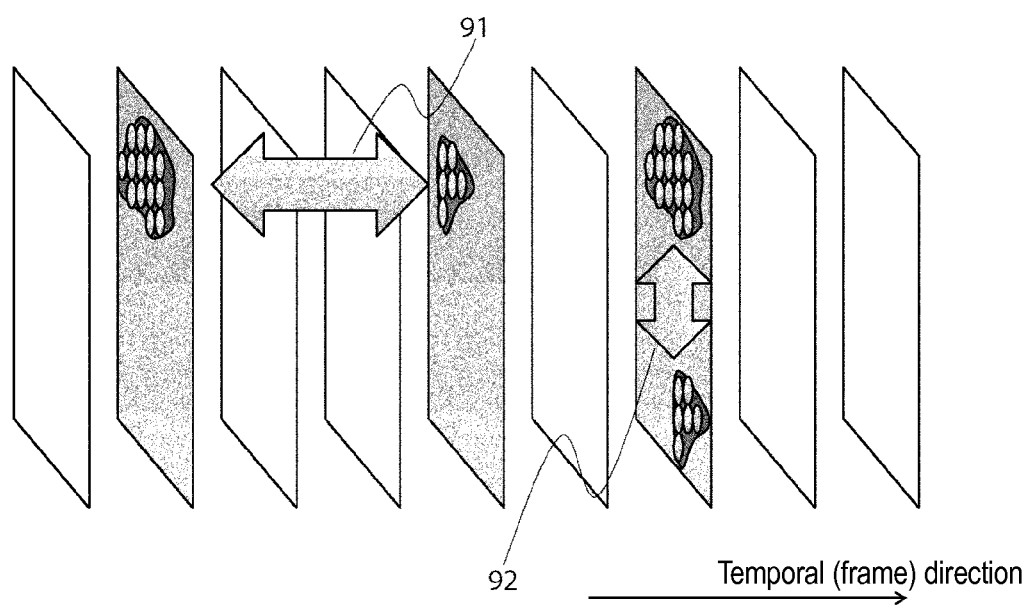
FIG. 9 is a diagram illustrating an eighth example of the spatiotemporal activity of the embodiment.

FIG. 9 illustrates an eighth example of the spatiotemporal activity. In FIG. 9, two or more regions for which the spatiotemporal activity is calculated have different shapes. Furthermore, in FIG. 9, the spatiotemporal activity is denoted by 91, and the spatial activity is denoted by 92.

Figure 10:
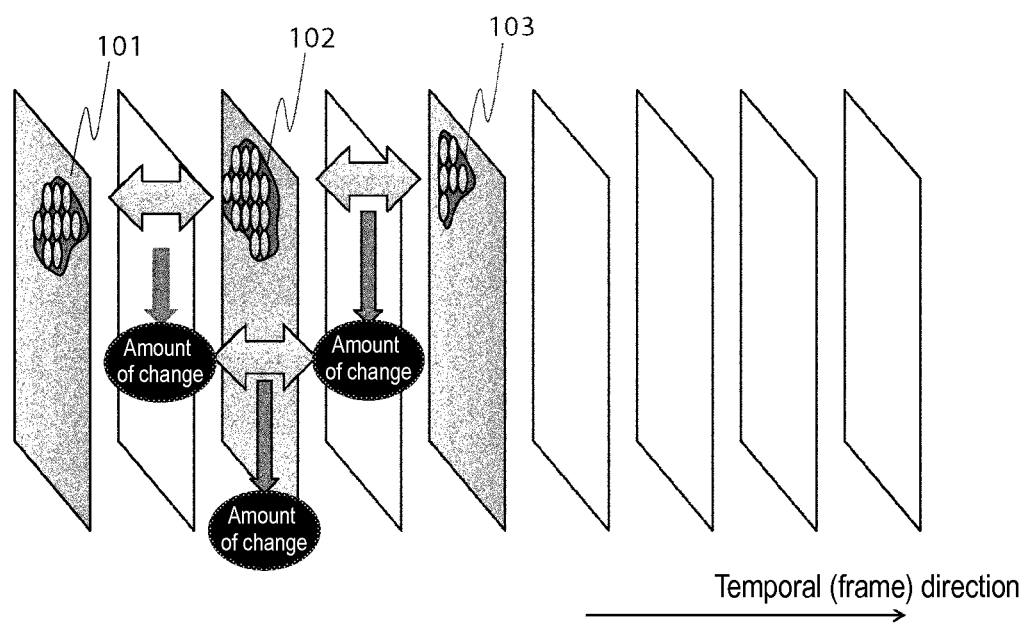
FIG. 10 is a diagram illustrating a ninth example of the spatiotemporal activity of the embodiment.

FIG. 10 illustrates a ninth example of the spatiotemporal activity. In FIG. 10, the spatiotemporal activity is an activity relating to three regions, that is, a difference between first difference information indicating a difference between two regions (regions 101 and 102), and second difference information indicating a difference between two regions (regions 102 and 103).

Figure 11:
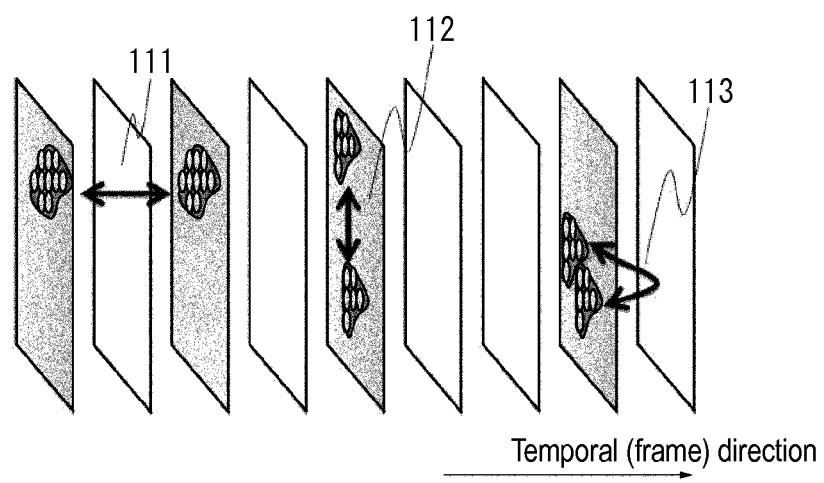
FIG. 11 is a diagram illustrating a tenth example of the spatiotemporal activity of the embodiment.

FIG. 11 illustrates a tenth example of the spatiotemporal activity. In FIG. 11, an example of the temporal activity is denoted by 111 that is an amount indicating a change between two spatially-identical but temporally-different regions. Also, examples of the spatial activities are denoted by 112 and 113, each indicating a change between two temporally-identical but spatially-different regions.

Figure 12:
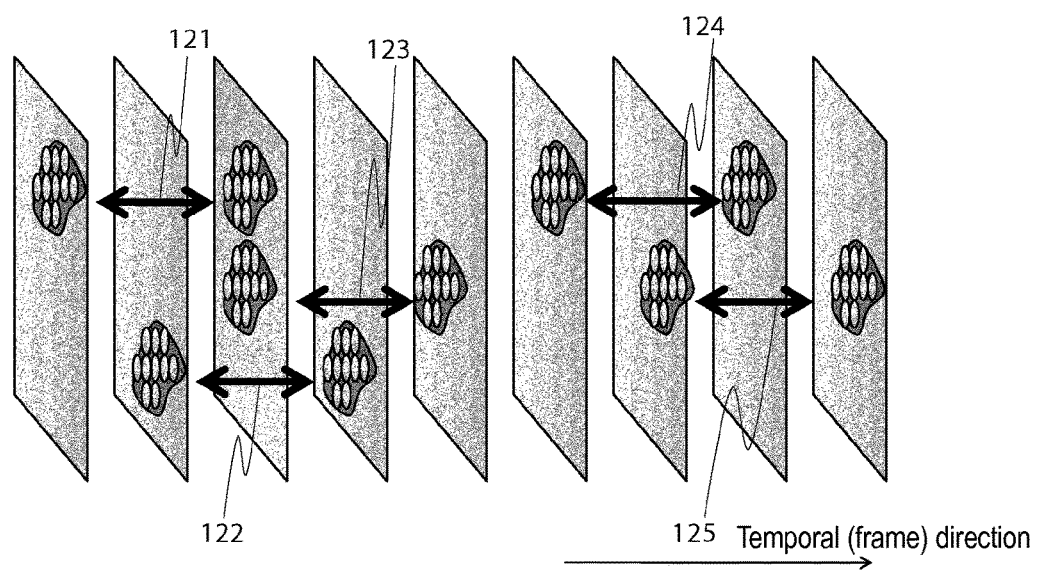
FIG. 12 is a diagram illustrating an eleventh example of the spatiotemporal activity of the embodiment.

FIG. 12 illustrates an eleventh example of the spatiotemporal activity. In FIG. 12, the spatiotemporal activity is an aggregation of information relating to changes (differences) between multiple regions. That is, the qualitative information acquiring unit 16 may calculate three differences between region sets 121, 122, and 123 at the same time, and may define an aggregation of the calculated three differences as the spatiotemporal activity. Alternatively, the qualitative information acquiring unit 16 may calculate two differences between region sets 124 and 125 at the same time, and may defines an aggregation of the calculated two differences as the spatiotemporal activity.

Figure 13:
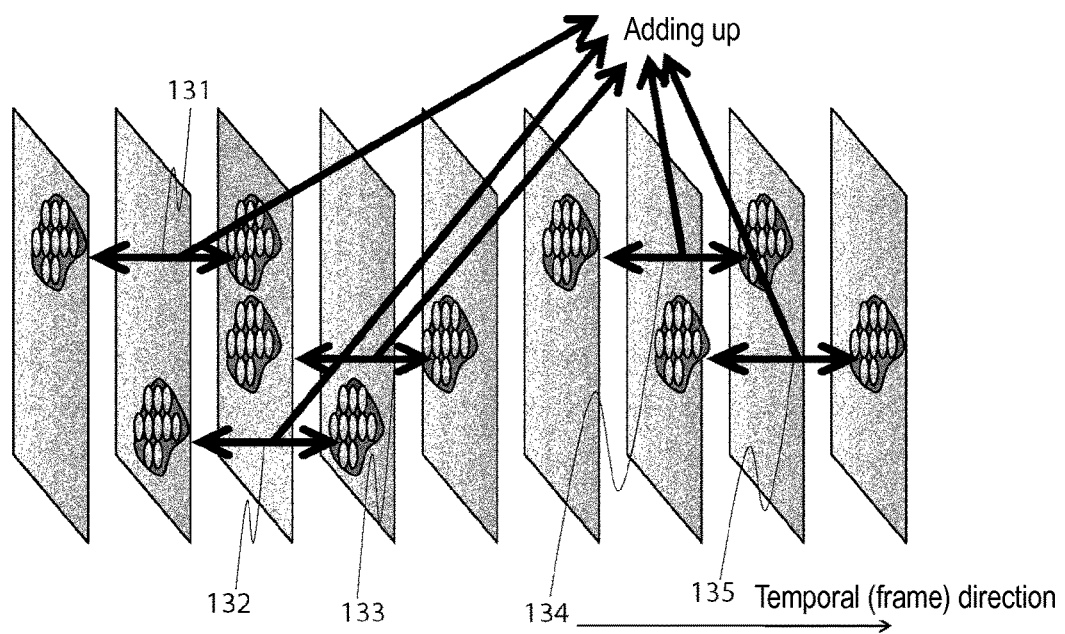
FIG. 13 is a diagram illustrating a twelfth example of the spatiotemporal activity of the embodiment.

FIG. 13 illustrates a twelfth example of the spatiotemporal activity. In FIG. 13, the spatiotemporal activity is a value obtained by adding up changes (differences) between multiple regions. That is, the qualitative information acquiring unit 16 may calculate five differences between region sets 131, 132, 133, 134, and 135 at the same time, and may define difference information obtained by adding up the five differences as the spatiotemporal activity.

Figure 14:
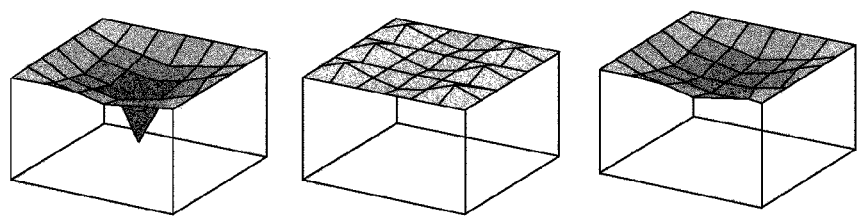
FIG. 14 is a diagram illustrating an example of a content characteristic diagram of the embodiment.
Figure 15:
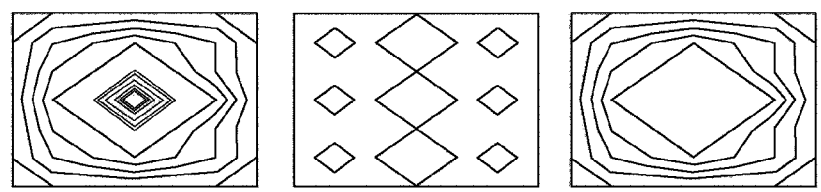
FIG. 15 is a diagram illustrating an example of the content characteristic diagram of the embodiment.
Figure 16:
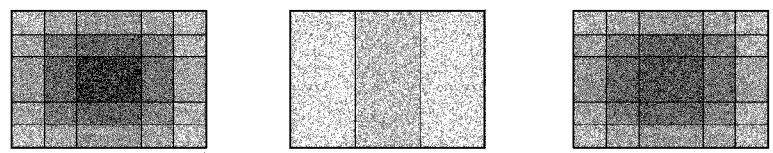
FIG. 16 is a diagram illustrating an example of the content characteristic diagram of the embodiment.

As described above, the content characteristic diagram (a collective term of the input content characteristic diagram and the output content characteristic diagram) graphically illustrates two or more feature amounts of a content, and is an image shown in, for example, FIG. 14. Since the spatiotemporal activity is information indicating an aspect of a spatiotemporal change, it can be expressed in a three-dimensional graph in which, for example, two-dimensional spaces are plotted on the x and y axes, and differences corresponding to the respective positions of the spaces are plotted on the z axis, as shown in FIG. 14. Also, the content characteristic diagram may be a diagram with contour lines as shown in FIG. 15, or a diagram in which values on the z axis are expressed in colors or gradation as shown in FIG. 16.

Also, an evaluation may be a choice of either "Good (e.g., "1") or "Poor (e.g., "0"), a choice from among three or more grades of evaluation values, or evaluation values of two or more characteristics. Note that the characteristics are, for example, a qualitative evaluation axis, such as visibility, an atmosphere, likeability, and the like. Also, the evaluation value of characteristics may be of two grades, or three or more grades.

As a part for inputting evaluations, any part may be used such as a numeric keypad, a keyboard, a mouse, a menu screen, and the like. The evaluation accepting unit 13 may be realized by a device driver for the input part such as a numeric keypad or a keyboard, or control software for a menu screen, for example.

The processing information accepting unit 14 accepts new processing information after the output unit 17 has output at least output qualitative information. Typically, a user (developer or the like) inputs the new processing information. Note that a part for inputting processing information may be any of a keyboard, a mouse, menu screen, and the like. The processing information accepting unit 14 can be realized by a device driver for the input part such as the keyboard, control software for the menu screen, or the like. Also, input of processing information by the user may be performed by the user inserting a volatile memory or the computer reading the processing information from a magnetic medium, an optical medium, or the like. In this case, the processing information accepting unit 14 is a reading apparatus that reads the processing information from such a storage medium or a memory, or a device driver. Also, input of processing information by the user may be performed via communication. In this case, the processing information accepting unit 14 is a network apparatus or a communication apparatus.

The processing unit 15 performs, on an input content, processing indicated by the processing information, and obtains an output content. The processing performed by the processing unit 15 depends on the processing information. The processing performed by the processing unit 15 is, for example, noise removal, resolution creation, or the like. The processing unit 15 may include a first processing part (not shown) that performs, on an input content, the processing indicated by the first processing information, and obtains an intermediate content, and a second processing part (not shown) that performs, on the intermediate content or a content obtained from the intermediate content, the processing indicated by the second processing information, and obtains an output content.

The processing unit 15 may be realized typically by an MPU, a memory, or the like. The processing procedure of the processing unit 15 is typically realized by software, and the software is stored in a storage medium such as a ROM. Note, however, that the processing procedure may be realized also by hardware (a dedicated circuit).

The qualitative information acquiring unit 16 acquires at least one type of qualitative information from among output qualitative information, which is qualitative information on the output content, and input qualitative information, which is qualitative information on the input content. Here, the input qualitative information is, for example, an input content characteristic diagram graphically illustrating two or more feature amounts of the input content. The input content characteristic diagram can also be referred to as "input characteristic image" since it is an image showing characteristics of the input content. Also, the qualitative information acquiring unit 16 may acquire intermediate qualitative information, which is qualitative information on the intermediate content.

Figure 17:
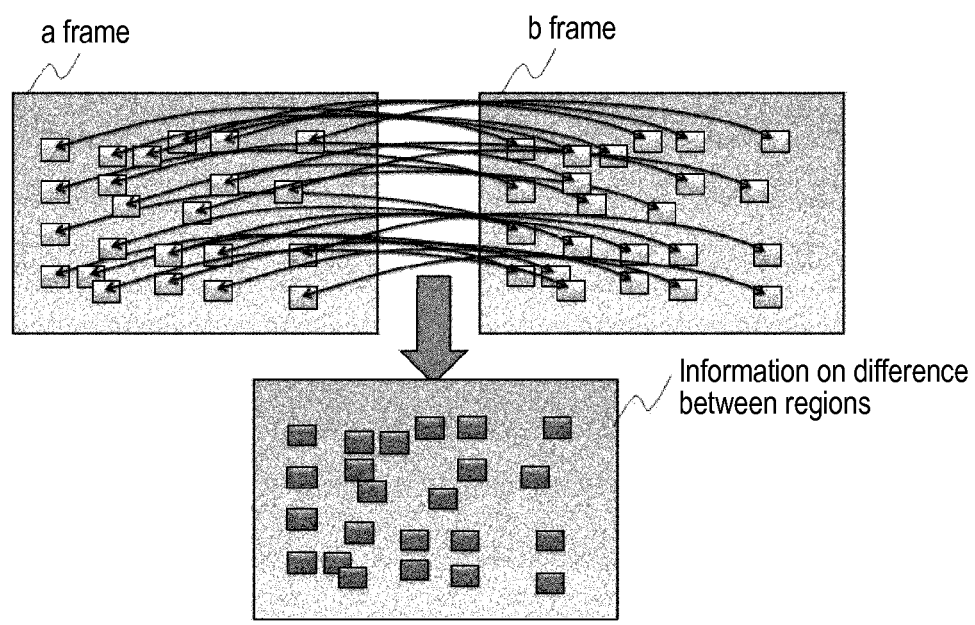
FIG. 17 is a diagram illustrating an example of processing of a qualitative information acquiring unit of the embodiment.

As shown in FIG. 17, for example, the qualitative information acquiring unit 16 acquires pairs of regions having the same rectangular shape, from multiple frames (e.g., the "a frame" and the "b frame"). Note that the "a frame" and the "b frame" may be temporally-identical frames or temporally-different frames. Here, objects for which a difference is calculated are assumed to be two regions located at the spatially-identical positions between the "a frame" and the "b frame". Hereinafter, positions of objects for which a difference is calculated are appropriately referred to as "regions".

Figure 18:
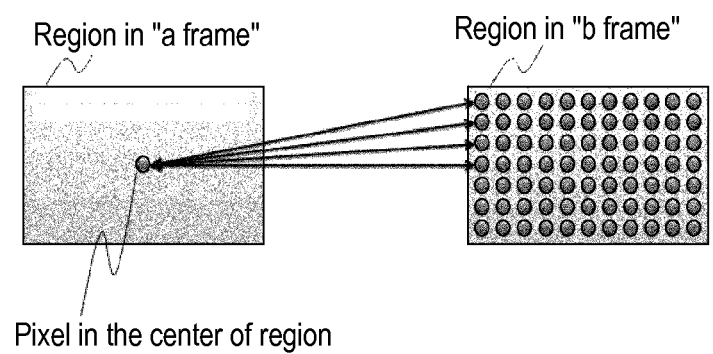
FIG. 18 is a diagram illustrating an example of the processing of the qualitative information acquiring unit of the embodiment.

Furthermore, as shown in FIG. 18, the qualitative information acquiring unit 16 may calculate, for example, absolute values of pixel differences between pixel information in the center of each region in the "a frame", and all pixels of each region in the "b frame". Note that the obtained pixel difference absolute values are rectangular information as with the shape of the regions.

Figure 19:
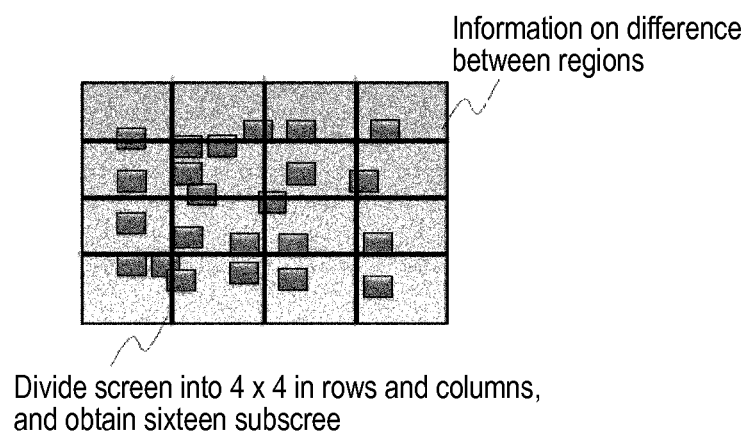
FIG. 19 is a diagram illustrating an example of the processing of the qualitative information acquiring unit of the embodiment.
Figure 20:
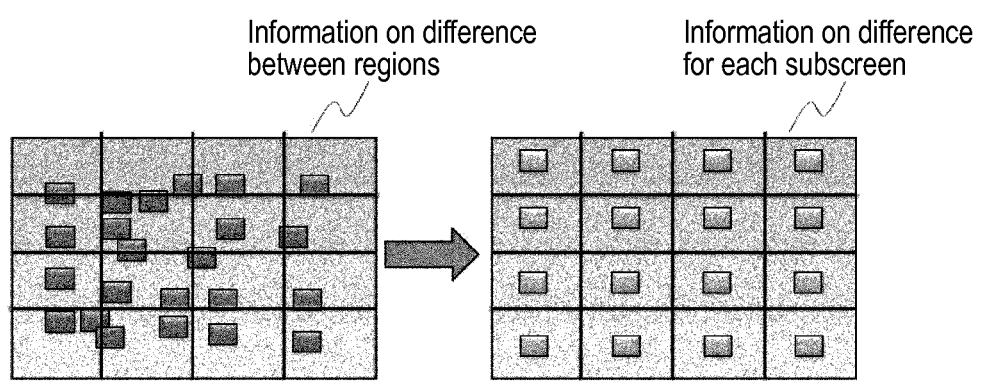
FIG. 20 is a diagram illustrating an example of the processing of the qualitative information acquiring unit of the embodiment.

Next, as shown in FIG. 19, the qualitative information acquiring unit 16 divides a screen into 4×4 in rows and columns, that is, into sixteen subscreens, for example. Then, as shown in FIG. 20, the qualitative information acquiring unit 16 performs integration of difference information of regions respectively included in the sixteen subscreens. Since a subscreen is typically larger than a region and the subscreen includes many regions, with this calculation, difference information for the subscreens results in a sum of the difference calculation results among many regions. By showing the pieces of information acquired in the above-described manner for the respective subscreens, graphical information can be obtained. An example of the graphical information is graphical information constituted by three-dimensional graphs as shown in FIG. 21.

Figure 21:
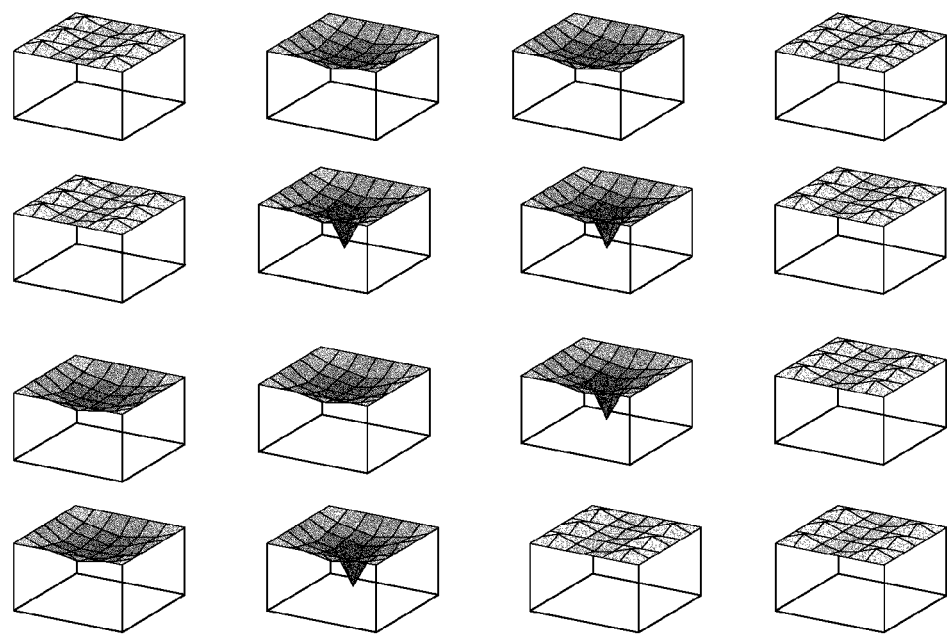
FIG. 21 is a diagram illustrating an example of the content characteristic diagram of the embodiment.
Figure 22:
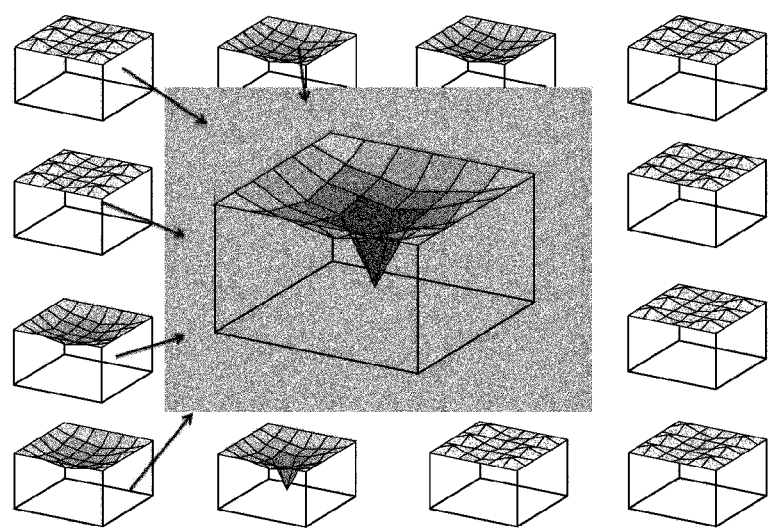
FIG. 22 is a diagram illustrating an example of the content characteristic diagram of the embodiment.
Figure 23:
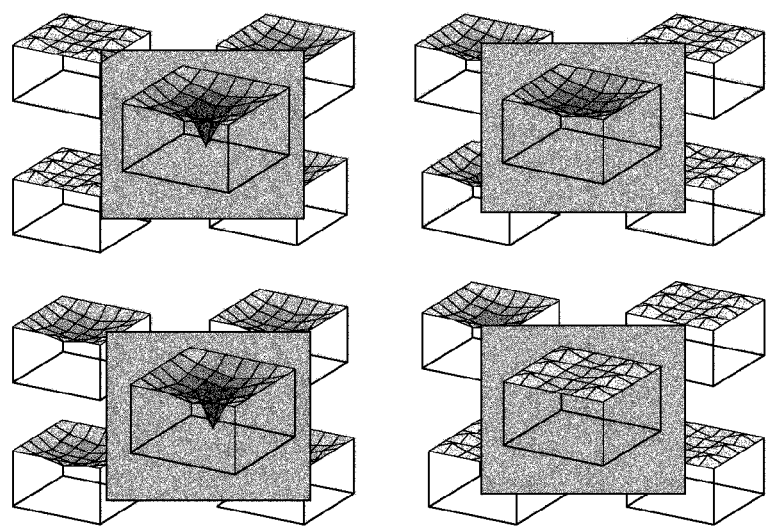
FIG. 23 is a diagram illustrating an example of the content characteristic diagram of the embodiment.

The qualitative information acquiring unit 16 may add up difference information of, for example, the sixteen subscreens of FIG. 21, and may construct an output content characteristic diagram constituted by a single three-dimensional graph (see FIG. 22). With this, it is possible to obtain a content characteristic diagram that shows characteristics of a larger spatial region than that described with reference to FIG. 21. In this case, it can be said that a content characteristic diagram of the entire screen is obtained by adding up all the subscreens. As shown in FIG. 23, it is also possible to add up difference information included in each of four subscreens obtained by dividing a screen into four, and to construct content characteristic diagrams constituted by four three-dimensional graphs. In this case, it can be said that a content characteristic diagram showing characteristics of one fourth of the screen is obtained by adding up the four regions.

Figure 24:
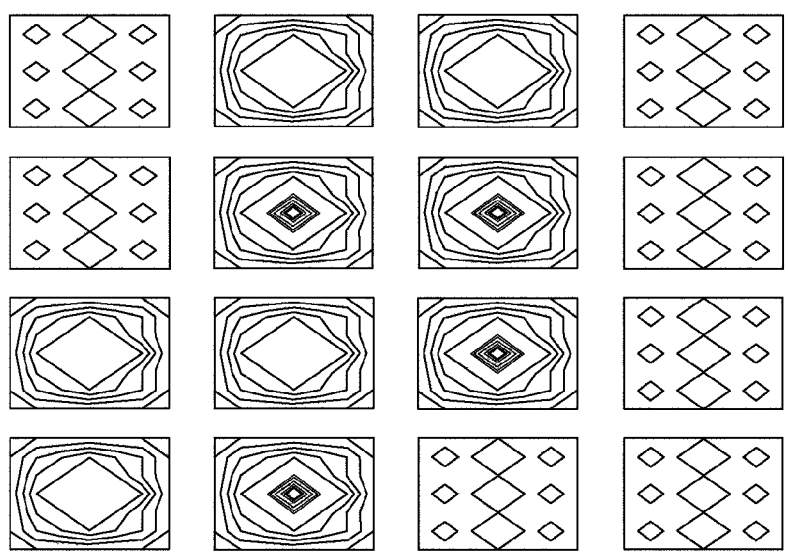
FIG. 24 is a diagram illustrating an example of the content characteristic diagram of the embodiment.
Figure 25:
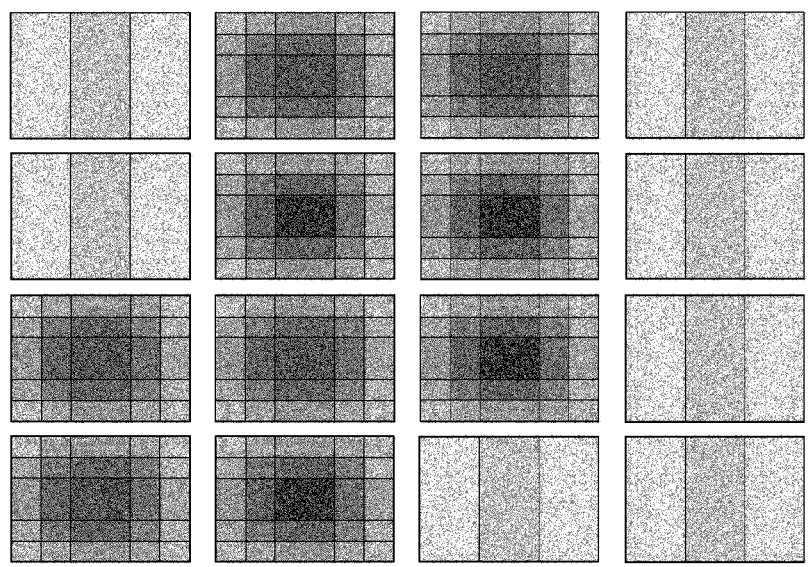
FIG. 25 is a diagram illustrating an example of the content characteristic diagram of the embodiment.
Figure 26:
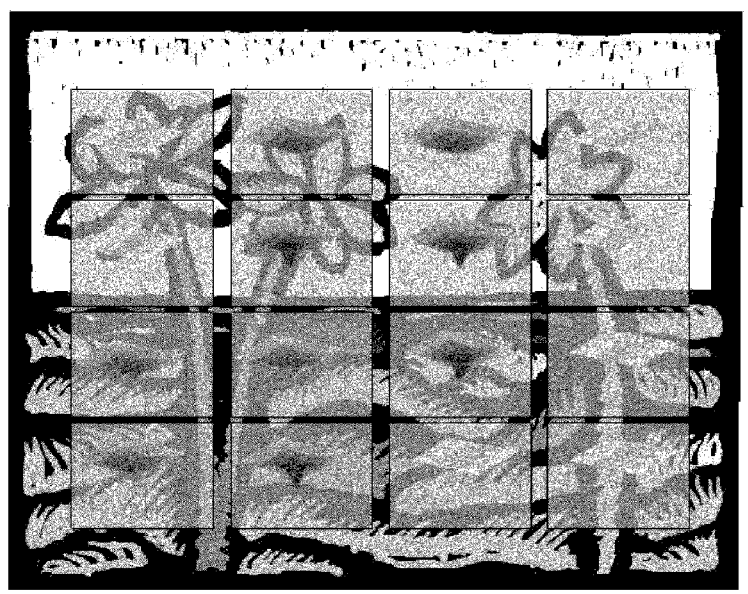
FIG. 26 is a diagram illustrating an example of an output of a content processing apparatus of the embodiment.

Note that the aspect of the graph of the content characteristic diagram may not necessarily be the above-described three-dimensional graph. The content characteristic diagram may be, for example, a characteristic image indicated by contour lines as shown in FIG. 24, or a characteristic image indicated by gradation as shown in FIG. 25. The content characteristic diagram may also be shown overlapping the content, as shown in FIG. 26.

The qualitative information acquiring unit 16 may be realized typically by an MPU, a memory, or the like. The processing procedure of the qualitative information acquiring unit 16 is typically realized by software, and the software is stored in a storage medium such as a ROM. Note, however, that the processing procedure may also be realized by hardware (a dedicated circuit).

The output unit 17 outputs the qualitative information acquired by the qualitative information acquiring unit 16. The output unit 17 preferably outputs at least one of an output content and an input content. Also, the output unit 17 may output, as shown in FIG. 26, together with the input content or the output content, an input content characteristic diagram or an output content characteristic diagram. Here, the translucent content characteristic diagram is output overlapping the content. In this context, the output is an idea including display on a display screen, projection using a projector, printing by a printer, transmission to an external apparatus (mainly a display apparatus), storing into a storage medium, and delivery of the processing results to another processing apparatus, another program, or the like.

The output unit 17 may also output an intermediate content and an intermediate qualitative information.

The output unit 17 may include or may not include an output device such as a display. The output unit 17 can be realized by driver software for an output device, driver software for an output device and the output device, or the like.

The processing information constructing unit 18 constructs new processing information based on the evaluation. If the evaluation is "Poor (e.g., "0"), the processing information constructing unit 18 replaces association information included in the processing information (here, a look-up table) with which the output content is generated from the input content by new association information (for example, association information that corresponds to the case where the evaluation is "Good (e.g., "1"). Specifically, for example, past evaluations and a processing information history selected based on that evaluation are stored in the processing information constructing unit 18, and if the evaluation is "Poor", the processing information constructing unit 18 can randomly apply association information that has not yet been used. Therefore, it is possible to test various pieces of association information until the evaluation becomes "Good". Also, if the processing information is an arithmetic expression including one or more variables, the processing information constructing unit 18, specifically, for example, generates random numbers to create parameters to be applied to the one or more variables of the arithmetic expression, substitutes the created parameters for the arithmetic expression, and constructs a new arithmetic expression until the evaluation becomes "Good".

The processing information constructing unit 18 may be realized typically by an MPU, a memory, or the like. The processing procedure of the processing information constructing unit 18 is typically realized by software, and the software is stored in a storage medium such as a ROM. Note, however, that the processing procedure may also be realized by hardware (a dedicated circuit).

The processing information updating unit 19 writes the processing information accepted by the processing information accepting unit 14 over the processing information in the processing information storage unit 11. Also, the processing information updating unit 19 may write the processing information constructed by the processing information constructing unit 18 over the processing information in the processing information storage unit 11. That is, the processing information of the processing information storage unit 11 may be updated manually or automatically.

The processing information updating unit 19 may be realized typically by an MPU, a memory, or the like. The processing procedure of the processing information updating unit 19 is typically realized by software, and the software is stored in a storage medium such as a ROM. Note, however, that the processing procedure may also be realized by hardware (a dedicated circuit).

Hereinafter, operations of the content processing apparatus 1 will be described with reference to a flowchart of FIG. 27.

(Step S2701) The content accepting unit 12 determines whether or not an input content has been accepted. If it is determined that an input content has been accepted, the procedure advances to step S2702, and otherwise, the procedure returns to step S2701.

(Step S2702) The processing unit 15 applies the processing information stored in the processing information storage unit 11 to the input content, and generates an output content.

(Step S2703) The qualitative information acquiring unit 16 acquires output qualitative information on the output content generated in step S2702.

(Step S2704) The qualitative information acquiring unit 16 acquires input qualitative information on the input content accepted in step S2701.

(Step S2705) The output unit 17 outputs the input content accepted in step S2701 and the output content generated in step S2702.

(Step S2706) The output unit 17 outputs the input qualitative information acquired in step S2704, and the output qualitative information acquired in step S2703.

(Step S2707) The evaluation accepting unit 13 determines whether or not an evaluation of information including the output qualitative information output by the output unit 17 has been accepted. If it is determined that the evaluation has been accepted, the procedure advances to step S2708, and otherwise, the procedure returns to step S2707.

(Step S2708) The processing information constructing unit 18 determines whether or not the evaluation accepted in step S2707 is a negative evaluation. If it is determined that the evaluation is a negative evaluation, the procedure advances to step S2709, and if it is determined that the evaluation is a positive evaluation, the procedure returns to step S2701.

(Step S2709) The processing information constructing unit 18 constructs new processing information.

(Step S2710) The processing information updating unit 19 writes the processing information constructed in step S2709 over the processing information in the processing information storage unit 11. The procedure returns to step S2701.

Figure 27:
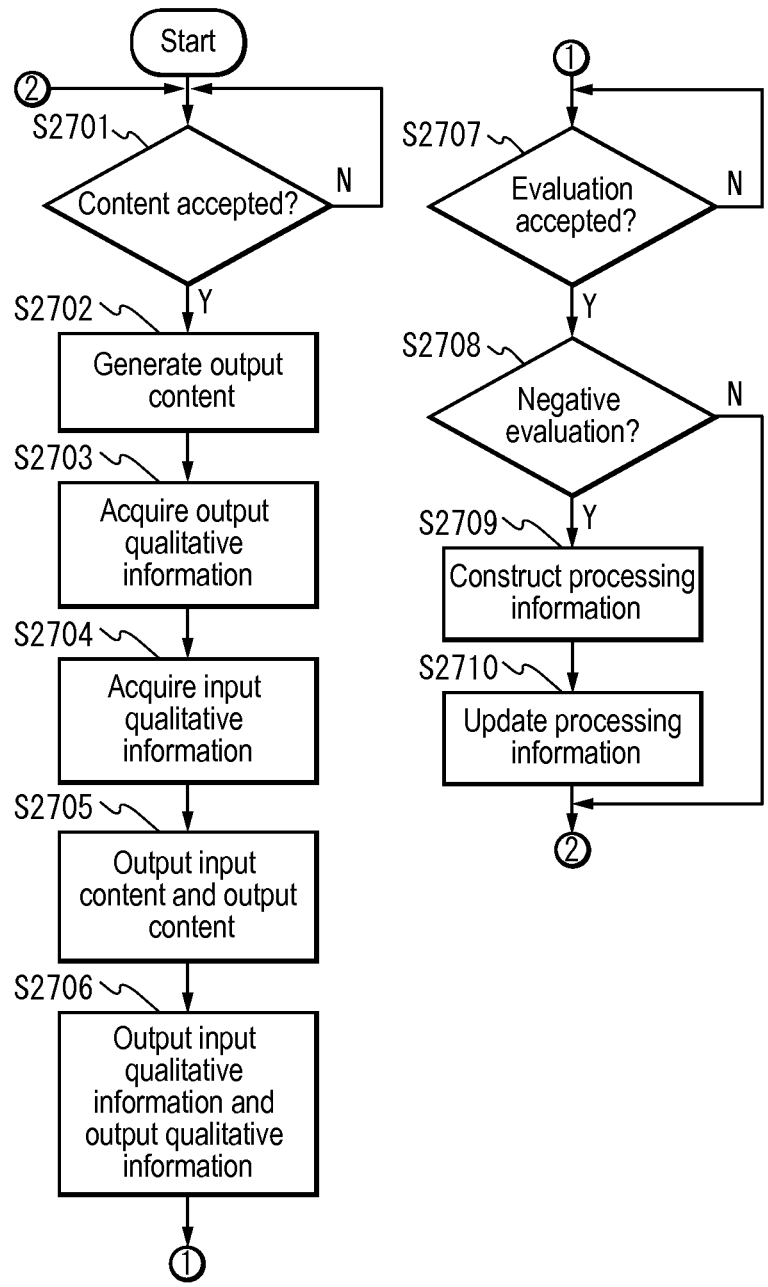
FIG. 27 is a flowchart illustrating operations of the content processing apparatus of the embodiment.

Note that, in the flowchart of FIG. 27, if the processing information is manually updated, the procedures of steps from S2707 to S2710 are unnecessary. In such a case, for example, the procedure returns to step S2701 in accordance with the user's instruction after the output qualitative information or the like is output.

Note that the process is terminated by powering off or an interruption at completion of the process in the flowchart of FIG. 27.

Hereinafter, specific operations of the content processing apparatus 1 according to the present embodiment will be described. It is here assumed that the qualitative information is a spatiotemporal activity, and a form of the spatiotemporal activity to be output is a three-dimensional graph as described above.

It is also assumed that the processing information storage unit 11 has stored therein a look-up table in which two or more pieces of association information are stored. It is furthermore assumed that each piece of the association information is associated with a feature amount vector.

Figure 28:
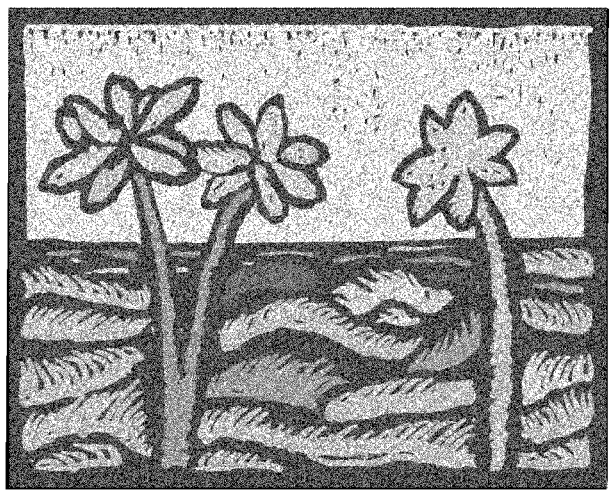
FIG. 28 is a diagram illustrating an example of a video that is accepted by a content accepting unit of the embodiment.

In such a situation, the content processing apparatus 1 is assumed to externally accept a video. That is, the content accepting unit 12 of the content processing apparatus 1 accepts a video as shown in FIG. 28.

Figure 29:
FIG. 29 is a diagram illustrating an example of an output content of the embodiment.

Next, the processing unit 15 obtains one or more feature amount from the input content, and acquires association information that is associated with a feature amount vector that is closest to the one or more feature amount. Then, the processing unit 15 applies the acquired association information to the input content, and generates an output content (see FIG. 29) that is deblured.

Next, the qualitative information acquiring unit 16 acquires a predetermined spatiotemporal activity of the input content, and configures an input content characteristic diagram, which is a three-dimensional graph, based on the spatiotemporal activity.

The qualitative information acquiring unit 16 also acquires a predetermined spatiotemporal activity of the output content, and configures an output content characteristic diagram, which is a three-dimensional graph, based on the spatiotemporal activity.

Figure 30:
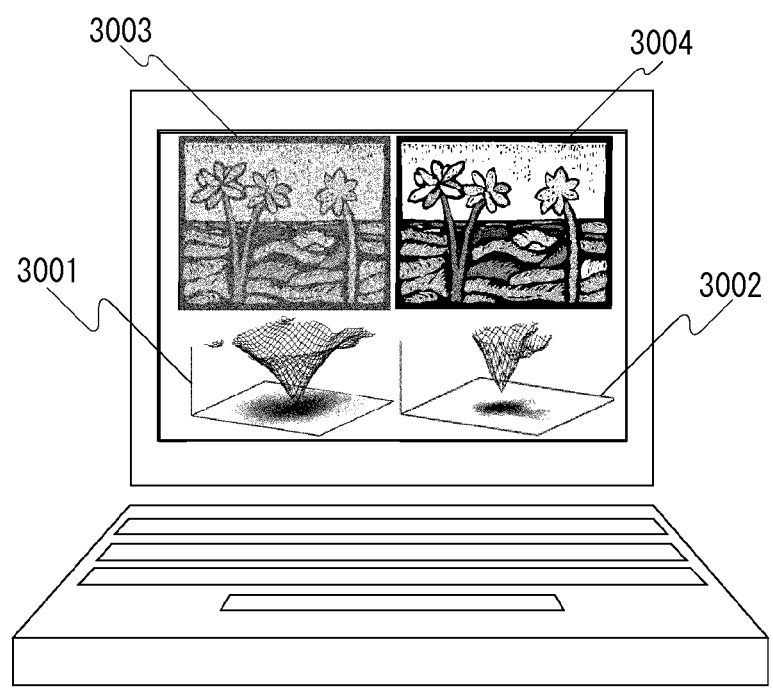
FIG. 30 is a diagram illustrating an example of an output of the content processing apparatus of the embodiment.

Then, the output unit 17 outputs the input content characteristic diagram and the output content characteristic diagram that were acquired by the qualitative information acquiring unit 16. The output unit 17 also outputs the output content and the input content. Examples of the outputs are shown in FIG. 30. In FIG. 30, an input content characteristic diagram 3001, an output content characteristic diagram 3002, an input content 3003, and an output content 3004 are displayed at the same time.

The user (developer) determines whether the processing information is good or poor by viewing the output of FIG. 30. If it is determined that the processing information is poor, the user develops new processing information (here, association information associated with a feature amount vector), and inputs it into the content processing apparatus 1. Then, the processing information accepting unit 14 of the content processing apparatus 1 accepts the processing information, and the processing information updating unit 19 writes the processing information over the processing information in the processing information storage unit 11.

Figure 31:
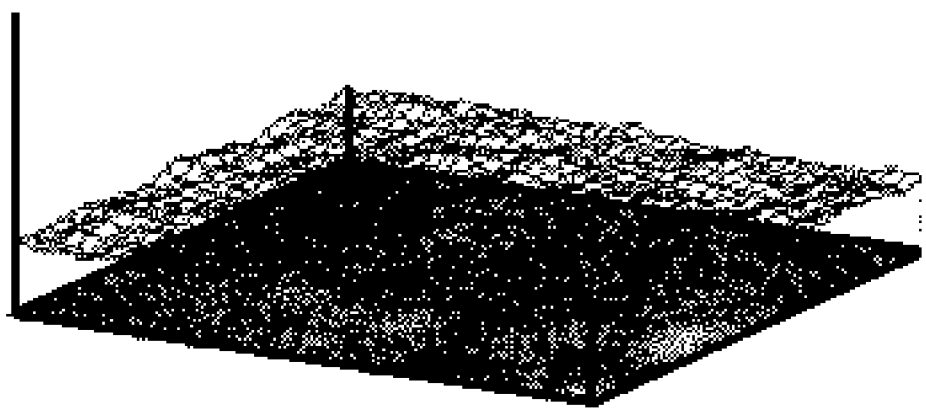
FIG. 31 is a diagram illustrating an example of the content characteristic diagram of the embodiment.

Note that if the input content characteristic diagram or the output content characteristic diagram has the shape as shown in FIG. 31, the developer determines that the input content or the output content is a very noisy image, and writes the processing information constituted by a noise removal program over the processing information in the processing information storage unit 11.

Figure 32:
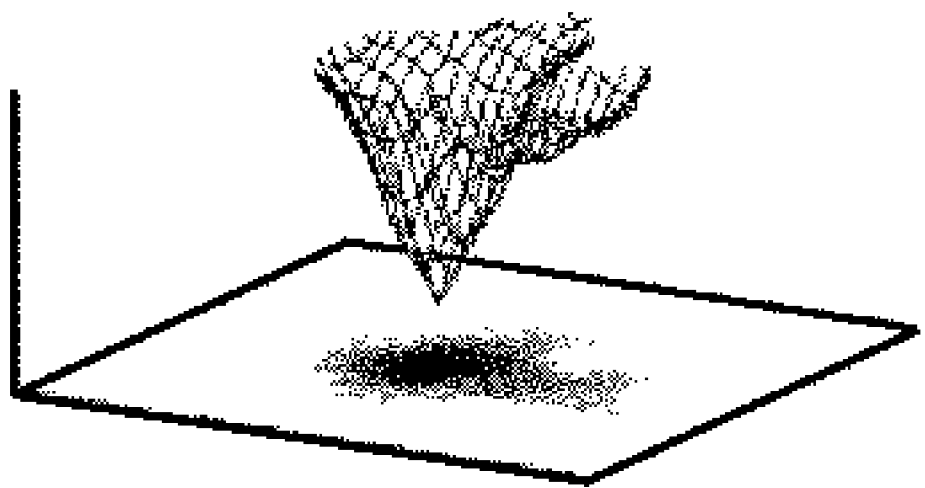
FIG. 32 is a diagram illustrating an example of the content characteristic diagram of the embodiment.

If the input content characteristic diagram or the output content characteristic diagram has the shape as shown in FIG. 32, the developer determines that the input content or the output content is a detailed natural image, and writes the processing information constituted by a program for performing processing in which the natural image can be output with the optimal resolution over the processing information in the processing information storage unit 11.

As described above, according to the present embodiment, characteristics of an input content or an output content are intuitively presented, allowing a signal processing developer to obtain a hint for improvement in signal processing, and to achieve development of signal processing more efficiently.

According to the present embodiment, the user (developer) can automatically update processing for generating an output content based on an input content, reflecting the result obtained by intuitively evaluating characteristics of the input content or the output content.

Note that, in the present embodiment, it is preferable for the user (developer) to adjust a method for calculating a spatiotemporal activity when evaluating an image. Specifically, it is a preferable for the user to adjust the shape or the positional relationship of regions for which a spatiotemporal activity is obtained, or a method for calculating a difference. Also, with respect to diagram illustration, it is preferable for the user to be able to select understandable display form (for example, a three-dimensional graph image, contour lines, a gradation image, or the like) in various ways.

The processing in this embodiment may be realized using software. The software may be distributed by software download or the like. Furthermore, the software, stored in a storage medium such as a CD-ROM, may be distributed. Note that the same is applied to other embodiments described in this specification. The software that realizes the content processing apparatus of the present embodiment may be the following sort of program. Specifically, this program is a program using a storage medium having stored therein processing information, which is information on processing to be performed on a content, the program causing a computer to function as: a content accepting unit that accepts an input content; a processing unit that executes, on the input content, processing indicated by the processing information, and obtains an output content; a qualitative information acquiring unit that acquires at least one type of qualitative information from among output qualitative information, which is qualitative information on the output content, and input qualitative information, which is qualitative information on the input content; and an output unit that outputs the qualitative information acquired by the qualitative information acquiring unit.

In the program, it is preferable to cause a computer to function so that the output unit also outputs at least one of the output content and the input content.

Also in the program, it is preferable to cause the computer to further function as: a processing information accepting unit that accepts new processing information after the output unit has output at least the output qualitative information; and a processing information updating unit that writes the processing information accepted by the processing information accepting unit over the processing information in the processing information storage unit.

Also in the program, it is preferable to cause the computer to further function as: an evaluation accepting unit that accepts an evaluation of information including the output qualitative information output by the output unit; a processing information constructing unit that constructs new processing information based on the evaluation; and a processing information updating unit that writes the processing information constructed by the processing information constructing unit over the processing information in the processing information storage unit.

Also in the program, it is preferable to cause the computer to function so that the output qualitative information is an output content characteristic diagram graphically illustrating two or more feature amounts of the output content.

Also in the program, it is preferable to cause the computer to function so that the output content characteristic diagram is a diagram illustrating two or more output spatiotemporal activities that are temporal and spatial activities of the output content.

Also in the program, it is preferable to cause the computer to function so that the input qualitative information is an input content characteristic diagram graphically illustrating two or more feature amounts of the input content.

Also in the program, it is preferable to cause the computer to function so that the input content characteristic diagram is a diagram illustrating two or more input spatiotemporal activities that are temporal and spatial activities of the input content.

Figure 33:
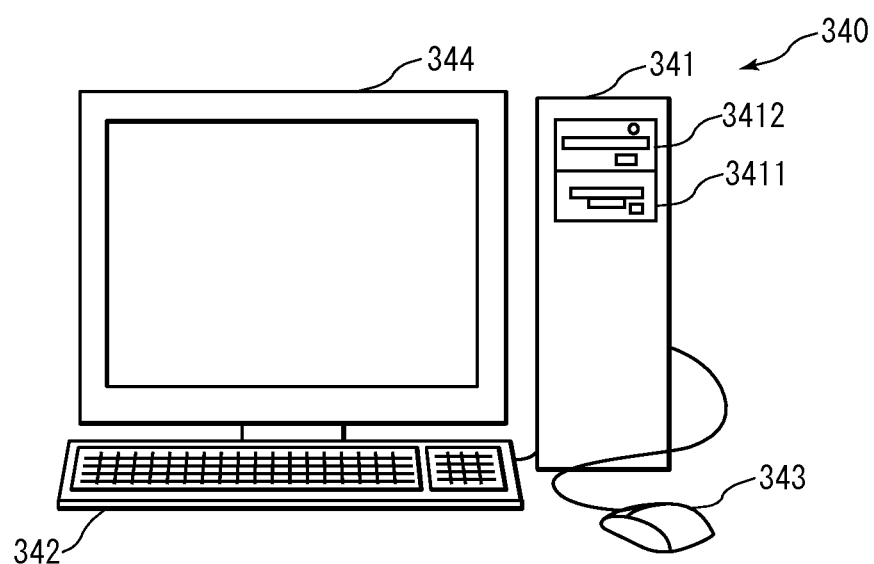
FIG. 33 is a schematic view illustrating a computer system of the embodiment.

FIG. 33 shows the external appearance of the computer that executes the program described in this specification to realize the content processing apparatus according to the foregoing various embodiments. The foregoing embodiments may be realized using computer hardware and a computer program executed thereon. FIG. 33 is a schematic view of this computer system 340, and FIG. 34 is a block diagram of the system 340.

In FIG. 33, the computer system 340 includes a computer 341 including an FD drive and a CD-ROM drive, a keyboard 342, a mouse 343, a monitor 344, a microphone 345, and a speaker 346.

Figure 34:
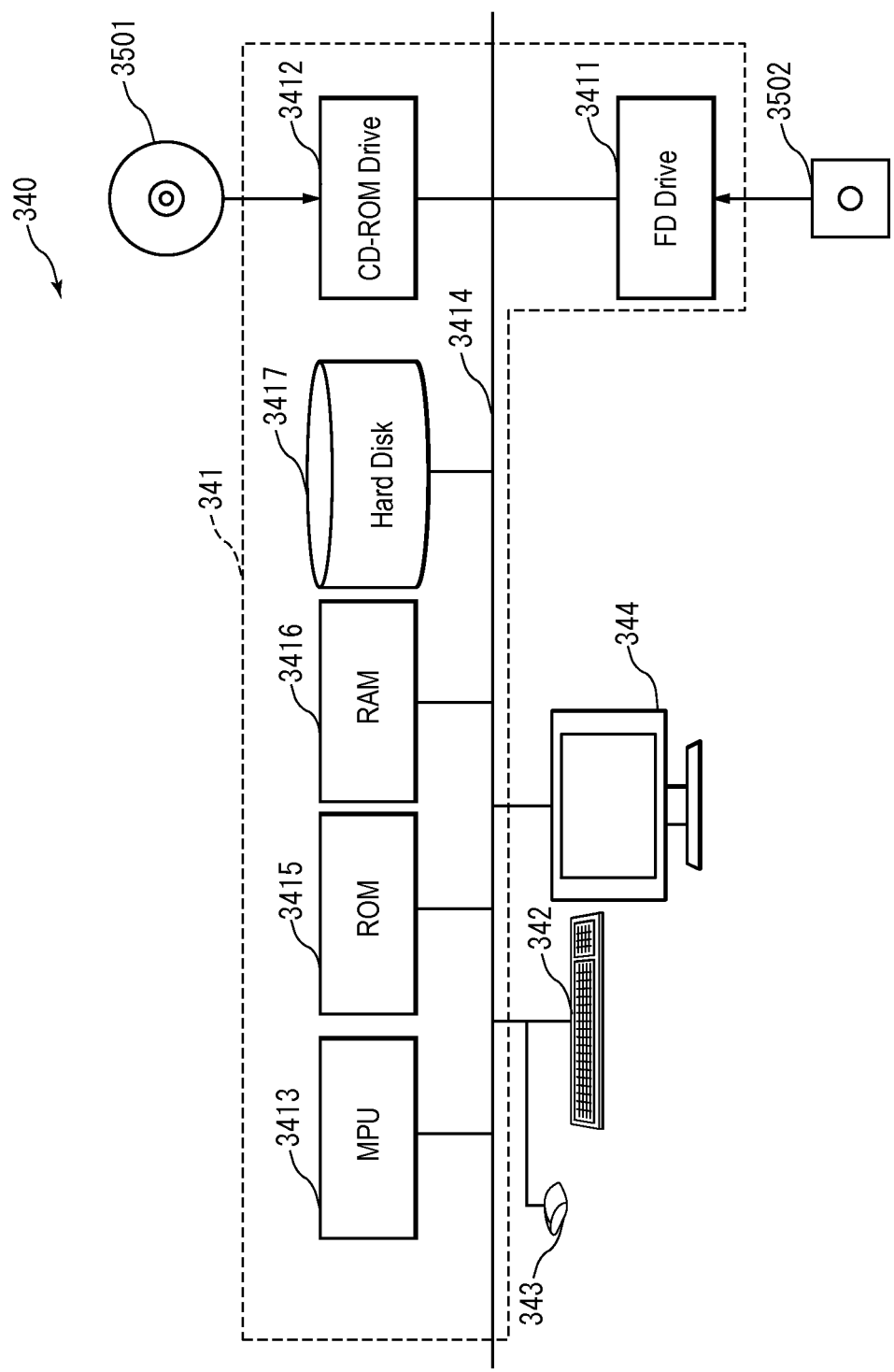
FIG. 34 is a block diagram illustrating the computer system of the embodiment.

In FIG. 34, the computer 341 includes, in addition to the FD drive 3411 and the CD-ROM drive 3412, an MPU 3413, a bus 3414 that is connected to the MPU 3413, the CD-ROM drive 3412, and the FD drive 3411, a ROM 3415 in which a program such as a boot up program is to be stored, a RAM 3416 that is connected to the MPU 3413, and in which a command of an application program is temporarily stored and a temporary storage area is to be provided, and a hard disk 3417 in which an application program, a system program, and data are to be stored. Although not shown here, the computer 341 may further include a network card that provides connection to a LAN.

The program for causing the computer system 340 to execute the functions of the content processing apparatus of the foregoing embodiments may be stored in a CD-ROM 3501 or an FD 3502, and transmitted to the hard disk 3417 by the CD-ROM 3501 or the FD 3502 being inserted into the CD-ROM drive 3412 or the FD drive 3411. Alternatively, the program may be transmitted via a network (not shown) to the computer 341 and stored in the hard disk 3417. At the time of execution, the program is loaded into the RAM 3416. The program may also be loaded from the CD-ROM 3501 or the FD 3502, or directly from a network.

The program does not necessarily have to include, for example, an operating system (OS) or a third party program to cause the computer 341 to execute the functions of the content processing apparatus of the foregoing embodiments. The program may only include a command portion to call an appropriate function (module) in a controlled mode and obtain the desired results. The manner in which the computer system 340 operates is well known, and thus a detailed description thereof is omitted.

It will be appreciated that processing performed by hardware is not included in the program.

Furthermore, the computer that executes this program may be a single computer, or may be multiple computers. More specifically, centralized processing may be performed, or decentralized processing may be performed.

Furthermore, in the foregoing embodiments, each process (each function) may be realized by centralized processing using a single apparatus (system), or may be realized by decentralized processing using multiple apparatuses.

It will be appreciated that the present invention is not limited to the embodiments set forth herein, and various modifications are possible within the scope of the present invention.

INDUSTRIAL APPLICABILITY

As described above, the content processing apparatus according to the present invention has an effect of enabling a user to intuitively evaluate characteristics of an input content or an output content and to achieve an improvement in a signal processing method more efficiently, and, thus, this apparatus is useful as an image processing apparatus and the like.

LIST OF REFERENCE NUMERALS

1 Content processing apparatus
11 Processing information storage unit
12 Content accepting unit
13 Evaluation accepting unit
14 Processing information accepting unit
15 Processing unit
16 Qualitative information acquiring unit
17 Output unit
18 Processing information constructing unit
19 Processing information updating unit

The invention claimed is:

1. A content processing apparatus comprising:
a non-transitory computer-readable storage medium configured to store processing information to be performed on an input image/video content; and
a processor in communication with the non-transitory computer-readable storage medium, the processor configured to:
receive the input content;
process the input content according to the processing information;
determine an output content based on the processing of the input content;
determine output qualitative information, the output qualitative information including an output content characteristic diagram graphically illustrating two or more output spatiotemporal activities that are temporal and spatial activities of the output content; and
output data indicative of the output qualitative information,
wherein the processor:
accepts an evaluation of the output qualitative information,
constructs new processing information based on the evaluation; and
replaces the processing information stored in the non-transitory computer-readable storage medium with the constructed new processing information.

2. The content processing apparatus according to claim 1, wherein the processor outputs data indicative of at least one of the output content and the input content.

3. The content processing apparatus according to claim 1, wherein the processor accepts new processing information after outputting the data indicative of the output qualitative information, and replaces the processing information stored in the non-transitory computer-readable storage medium with the accepted new processing information.

4. The content processing apparatus according to claim 1, wherein the processing information at least includes first processing information for performing first processing, and second processing information for performing second processing, and
wherein the processor:
executes, on the input content, the processing indicated by the first processing information to obtain an intermediate content;
executes, on the intermediate content or a content obtained from the intermediate content, the processing indicated by the second processing information to obtain an output content; and
outputs data indicative of the intermediate content.

5. The content processing apparatus according to claim 1, wherein the processing information at least includes first processing information for performing first processing, and second processing information for performing second processing, and
wherein the processor:

executes, on the input content, the processing indicated by the first processing information, and obtains an intermediate content;

executes, on the intermediate content or a content obtained from the intermediate content, the processing indicated by the second processing information, and obtains an output content;

determines qualitative information on the intermediate content; and outputs data indicative of the qualitative information.

6. The content processing apparatus according to claim 1, wherein the input content and the output content are images.

7. The content processing apparatus according to claim 1, wherein the input content and the output content are sound information.

8. A content processing method using a storage area in which processing information, which is information on processing to be performed on an input image/video content, is stored, and realized with a content accepting unit, a processing unit, a qualitative information acquiring unit, and an output unit, the content processing method comprising:

a content accepting step of the content accepting unit accepting the input content;

a processing step of the processing unit executing, on the input content, processing indicated by the processing information, and obtaining an output content;

a qualitative information acquiring step of the qualitative information acquiring unit acquiring output qualitative information, which is an aggregation of two or more spatiotemporal activities of the output content, or input qualitative information, which is an aggregation of two or more spatiotemporal activities of the input content;

an output step of the output unit outputting the qualitative information acquired in the qualitative information acquiring step, accepting, by the processing unit, an evaluation of the output qualitative information, constructing, by the processing unit, new processing information based on the evaluation; and replacing the processing information stored in the storage area with the constructed new processing information.

9. A non-transitory storage medium in which a program is stored, and that includes a storage area in which processing information, which is information on processing to be performed on an input image/video content, is stored, the program causing a computer to function as:

a content accepting unit that accepts the input content;

a processing unit that executes, on the input content, processing indicated by the processing information, and obtains an output content;

a qualitative information acquiring unit that acquires output qualitative information, which is an aggregation of two or more spatiotemporal activities of the output content, or input qualitative information, which is an aggregation of two or more spatiotemporal activities of the input content; and an output unit that outputs the qualitative information acquired by the qualitative information acquiring unit, wherein the processing unit:

accepts an evaluation of the output qualitative information, constructs new processing information based on the evaluation; and replaces the processing information stored in the storage area with the constructed new processing information.

10. The content processing apparatus of claim 1, wherein the processor is configured to:

determine input qualitative information, the input qualitative information including an input content characteristic diagram graphically illustrating two or more input spatiotemporal activities that are temporal and spatial activities of the input content; and output data indicative of the input qualitative information.

11. The content processing apparatus of claim 10, wherein the input content characteristic diagram and the output content characteristic diagram are displayed simultaneously side by side on an output unit.

12. The content processing apparatus of claim 1, wherein the input content and the output content are in video format.

13. The content processing apparatus of claim 1, wherein the output content characteristic diagram includes a three-dimensional graph.

14. The content processing apparatus of claim 1, wherein the output content characteristic diagram includes a contour line graph.

15. The content processing apparatus of claim 1, wherein the output content characteristic diagram includes a gradation graph.

* * * * *